United States Patent [19]

Suzuki

[11] Patent Number: 6,163,342
[45] Date of Patent: Dec. 19, 2000

[54] IMAGE SENSING METHOD AND APPARATUS

[75] Inventor: Masao Suzuki, Tokyo, Japan

[73] Assignee: Canon Kabushiki Kaisha, Tokyo, Japan

[21] Appl. No.: 08/960,168

[22] Filed: Oct. 29, 1997

Related U.S. Application Data

[63] Continuation of application No. 08/496,891, Jun. 30, 1995, abandoned.

[30] Foreign Application Priority Data

Jul. 5, 1994 [JP] Japan .................................. 6-153985

[51] Int. Cl.[7] ........................... H04N 3/14; H04N 5/235; H04N 5/238
[52] U.S. Cl. ......................... 348/364; 348/222; 348/229; 348/279; 348/296; 348/342; 358/483; 396/96
[58] Field of Search ................................ 348/207, 222, 348/223, 224, 228, 252, 253, 254, 255, 256, 296, 356, 362, 363, 364, 365, 229, 230, 266–273, 278, 279, 335, 342; 358/462; 382/174, 176; 396/89, 96, 99; H04N 5/238, 5/235, 3/14

[56] References Cited

U.S. PATENT DOCUMENTS

| | | | |
|---|---|---|---|
| 4,638,350 | 1/1987 | Kato et al. | 358/29 |
| 4,785,330 | 11/1988 | Yoshida et al. | 355/14 R |
| 4,843,476 | 6/1989 | Fujioka | 358/228 |
| 5,079,622 | 1/1992 | Toshinobu | 358/32 |
| 5,369,507 | 11/1994 | Tanaka | 358/462 |
| 5,489,945 | 2/1996 | Kannegundla . | |
| 5,579,049 | 11/1996 | Shimaija et al. | 348/364 |
| 5,828,406 | 10/1998 | Parulski | 348/220 |

*Primary Examiner*—Wendy Garber
*Assistant Examiner*—Ngoc-Yen Vu
*Attorney, Agent, or Firm*—Robin, Blecker & Daley

[57] ABSTRACT

When a selecting unit selects a second mode for sensing a document or the like, image signals obtained by exposing an exposing unit enters a second mode unit through a clamping unit and the selecting unit. High resolution image signals are generated in the second mode unit. Meanwhile, levels of the electrical image signals are detected by a detecting unit, and a control unit performs either exposure control by the exposing unit and gain control by a gain control unit or both in accordance with a peak level of the detected levels of the electrical image signals. At the same time, a correction unit sets a target value for the levels of the electrical image signals in accordance with a selected mode. The electrical image signals are controlled so that the detected levels approach the target value, thereby a document, an illustration, and the like can be sensed in high resolution and an image of high quality can be obtained regardless of character density in the document.

7 Claims, 20 Drawing Sheets

F I G. 11(a)
OUTPUT FROM
PRE-PROCESSING CIRCUIT

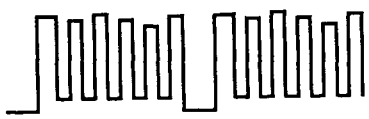

F I G. 11(b)
OUTPUT FROM
PRE-PROCESSING CIRCUIT
(WHEN LEVELS AT BLACK PORTIONS
ARE HIGH IN DOCUMENT MODE)

F I G. 11(c)
BLK (IN PICTURE MODE)

F I G. 11(d)
CLP (IN PICTURE MODE)

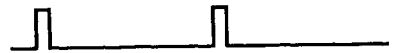

F I G. 11(e)
PULSE CLAMPING OUTPUT
(IN PICTURE MODE)

CLAMPING LEVEL
(STANDARD LEVEL
FOR A/D CONVERSION)

F I G. 11(f)
DARK CLAMPING OUTPUT
(WHEN LEVELS AT BLACK PORTIONS
ARE HIGH IN DOCUMENT MODE)

CLAMPING LEVEL
(STANDARD LEVEL
FOR A/D CONVERSION)

F I G. 11(g)
BLK (IN DOCUMENT MODE)

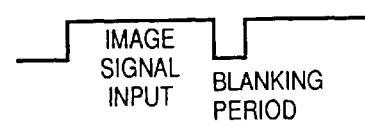

IMAGE SIGNAL INPUT    BLANKING PERIOD

F I G. 11(h)
CLP (IN DOCUMENT MODE)

F I G. 11(i)
DARK CLAMPING OUTPUT
(IN DOCUMENT MODE)

CLAMPING LEVEL
(STANDARD LEVEL
FOR A/D CONVERSION)

F I G. 11(j)
DARK CLAMPING OUTPUT
(WHEN LEVELS AT BLACK PORTIONS
ARE HIGH IN DOCUMENT MODE)

CLAMPING LEVEL
(STANDARD LEVEL
FOR A/D CONVERSION)

F I G. 11(k)
FINAL A/D INPUT
(WHEN LEVELS AT BLACK PORTIONS
ARE HIGH IN DOCUMENT MODE)

CLAMPING LEVEL
(STANDARD LEVEL
FOR A/D CONVERSION)

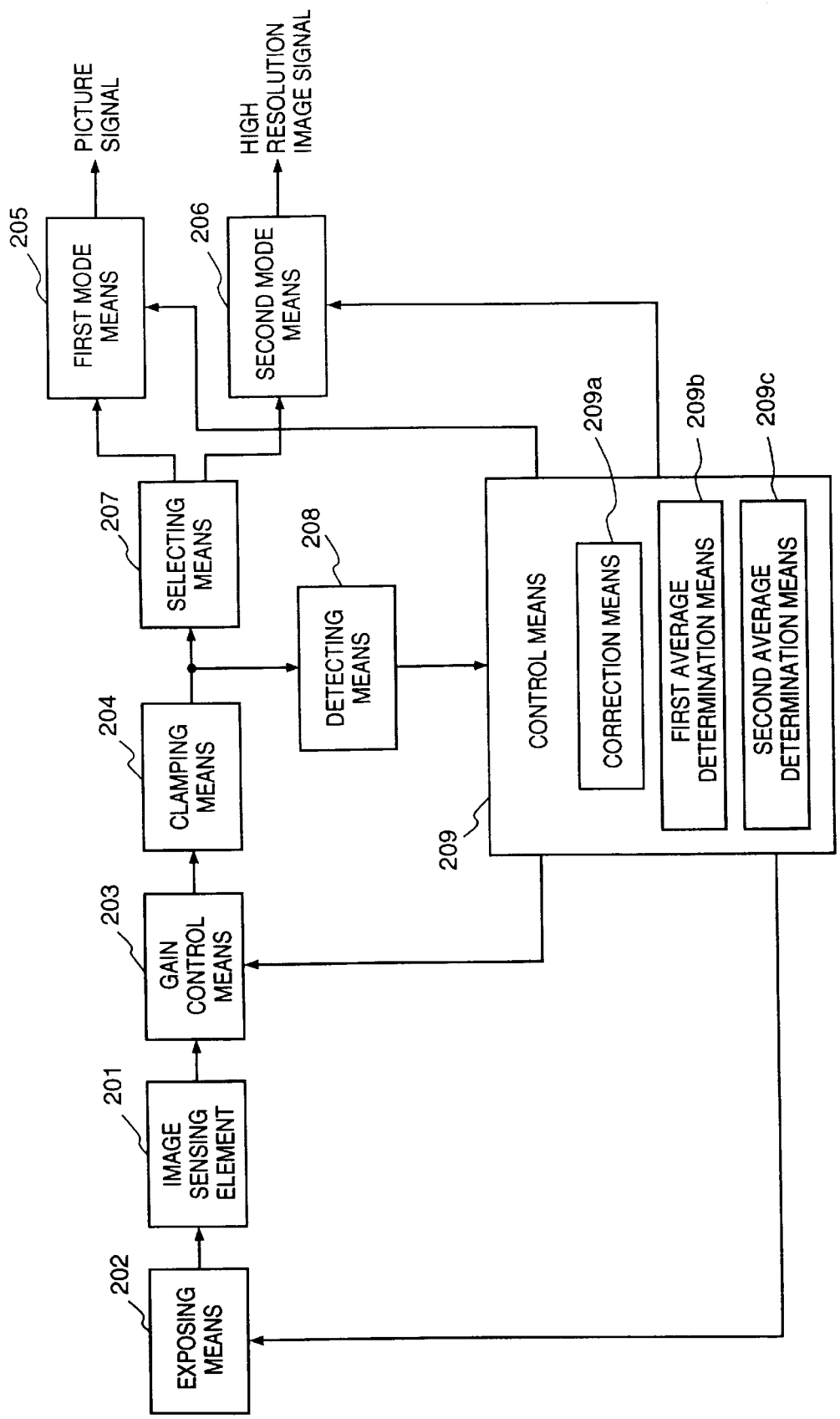

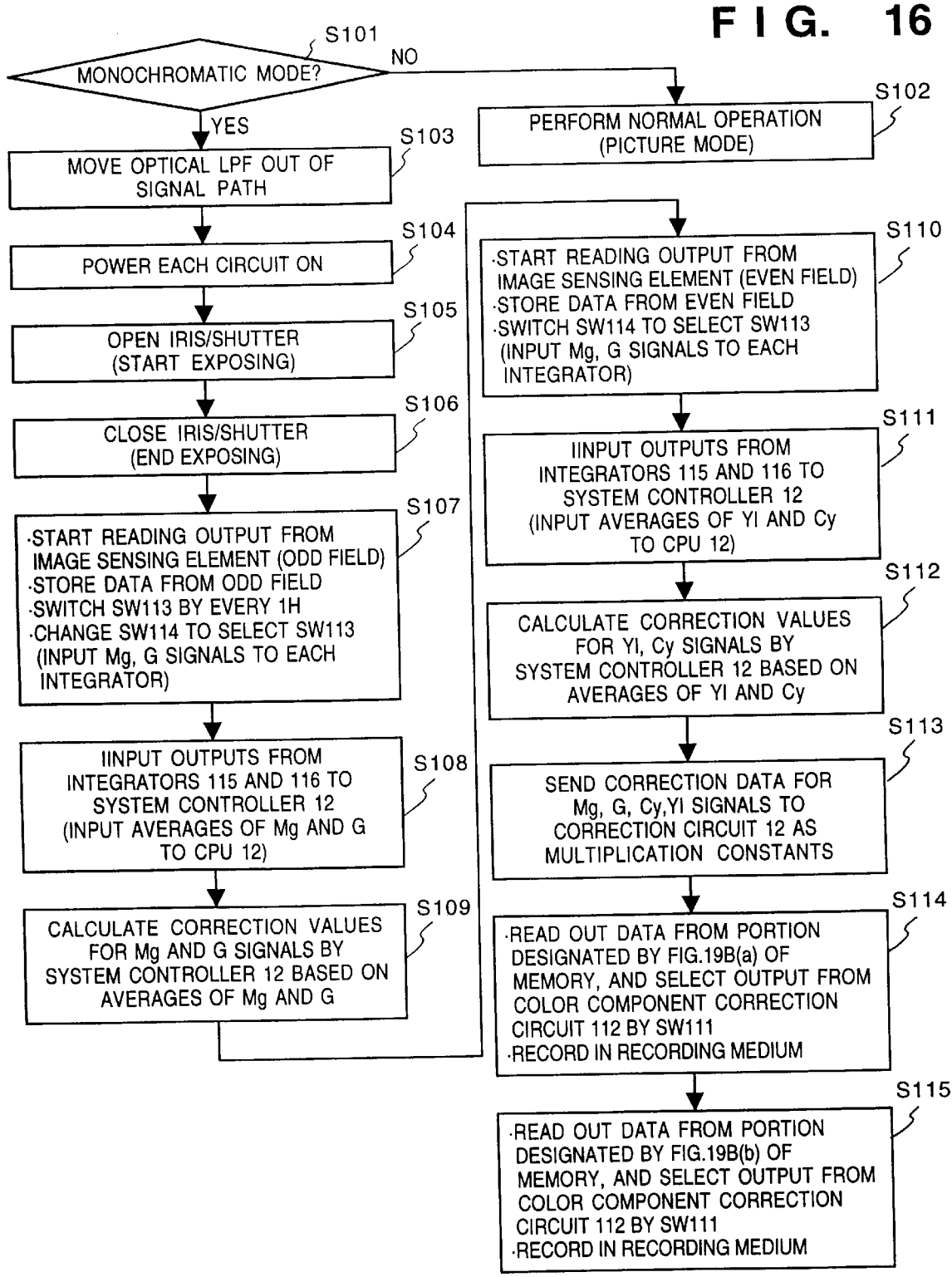
F I G. 16

FIG. 18

|     |     |     |     |     |     |     |     |     |     |     |     | ODD | EVEN |
|-----|-----|-----|-----|-----|-----|-----|-----|-----|-----|-----|-----|-----|------|
| Mg  | G   | Mg  | G   | Mg  | G   | Mg  | G   | Mg  | G   | Mg  | G   | Mg  | →    |
| Yl  | Cy  | Yl  | Cy  | Yl  | Cy  | Yl  | Cy  | Yl  | Cy  | Yl  | Cy  | Yl  | →    |
| G   | Mg  | G   | Mg  | G   | Mg  | G   | Mg  | G   | Mg  | G   | Mg  | G   | →    |
| Yl  | Cy  | Yl  | Cy  | Yl  | Cy  | Yl  | Cy  | Yl  | Cy  | Yl  | Cy  | Yl  | →    |
| Mg  | G   | Mg  | G   | Mg  | G   | Mg  | G   | Mg  | G   | Mg  | G   | Mg  | →    |
| Yl  | Cy  | Yl  | Cy  | Yl  | Cy  | Yl  | Cy  | Yl  | Cy  | Yl  | Cy  | Yl  | →    |
| G   | Mg  | G   | Mg  | G   | Mg  | G   | Mg  | G   | Mg  | G   | Mg  | G   | →    |
| Yl  | Cy  | Yl  | Cy  | Yl  | Cy  | Yl  | Cy  | Yl  | Cy  | Yl  | Cy  | Yl  | →    |
| Mg  | G   | Mg  | G   | Mg  | G   | Mg  | G   | Mg  | G   | Mg  | G   | Mg  | →    |

FIG. 19A

| Mg | G | Mg | G | Mg | G | - - - - - - - - - - - - - - - - |
|---|---|---|---|---|---|---|
|  |  |  |  |  |  |  |
| G | Mg | G | Mg | G | Mg | - - - - - - - - - - - - - - - - |
|  |  |  |  |  |  |  |
| Mg | G | Mg | G | Mg | G | - - - - - - - - - - - - - - - - |
|  |  |  |  |  |  |  |
| G | Mg | G | Mg | G | Mg | - - - - - - - - - - - - - - - - |
|  |  |  |  |  |  |  |
| Mg | G | Mg | G | Mg | G | - - - - - - - - - - - - - - - - |
|  |  |  |  |  |  |  |
| G | Mg | G | Mg | G | Mg | - - - - - - - - - - - - - - - - |
|  |  |  |  |  |  |  |
| - - | - - | - - | - - | - - | - - | - - - - - - - - - - - - - - - - |

C1 is the first row group, C2 is the second row group.

FIG. 19B(a)

| Mg | G | Mg | G | Mg | G | - - - - - - - - - - - - - - - - |
|---|---|---|---|---|---|---|
| Yl | Cy | Yl | Cy | Yl | Cy | - - - - - - - - - - - - - - - - |
| G | Mg | G | Mg | G | Mg | - - - - - - - - - - - - - - - - |
| Yl | Cy | Yl | Cy | Yl | Cy | - - - - - - - - - - - - - - - - |
| - - | - - | - - | - - | - - | - - | - - - - - - - - - - - - - - - - |
| Yl | Cy | Yl | Cy | Yl | Cy | - - - - - - - - - - - - - - - - |

FIG. 19B(b)

| Mg | G | Mg | G | Mg | G | - - - - - - - - - - - - - - - - |
|---|---|---|---|---|---|---|
| Yl | Cy | Yl | Cy | Yl | Cy | - - - - - - - - - - - - - - - - |
| G | Mg | G | Mg | G | Mg | - - - - - - - - - - - - - - - - |
| Yl | Cy | Yl | Cy | Yl | Cy | - - - - - - - - - - - - - - - - |
| Mg | G | Mg | G | Mg | G | - - - - - - - - - - - - - - - - |
| - - | - - | - - | - - | - - | - - | - - - - - - - - - - - - - - - - |
| Yl | Cy | Yl | Cy | Yl | Cy | - - - - - - - - - - - - - - - - |

IMAGE SENSING METHOD AND APPARATUS

This is a continuation application under 37 CFR 1.62 of prior application Ser. No. 08/496,891, filed Jun. 30, 1995 now abandoned.

BACKGROUND OF THE INVENTION

The present invention relates to an image sensing method and apparatus and, more particularly, to an image sensing method and apparatus capable of sensing a document and a drawing such as an illustration in high resolution.

Conventionally, many kinds of image sensing devices, such as a video camera and an electronic still camera, capable of sensing natural pictures in high quality have been developed and supplied in the market. Recently, image sensing devices have been developed to serve as information collecting devices, since information processing devices, such as a computer, have been personalized. Accordingly, there is a demand for the image sensing devices having ability to sense characters, numerals, figures, and so on, in high quality.

In order to sense a document and a drawing in high quality, it is necessary to properly control the light exposure. However, a problem in variation of exposure level arises by variation in character density in a document.

If the exposure level varies as described above, contrast between sensed character parts and background parts in the document become unclear. Therefore, there is a problem in that characters in picked-up images cannot be identified in many cases.

When a natural picture is sensed, it will be sensed in almost good quality by adjusting an integrated value of image signal of the picture inside of an area of light measurement (after $\gamma$ process) to about a level of 50% to 60% of a dynamic range of an image signal. In contrast, if a document with black letters on white paper is sensed at the same level, an image signal level of the white parts is too low to identify characters or to be used in an OCR device.

Further, if the color and brightness of the paper of the document differ from those of white paper, and if the same image sensing condition for sensing the black characters in the white paper is used to sense the document, difference between levels of character parts and of background parts may not be large enough. In this case, problems occur in that the character parts and the background parts cannot be separated from each other and that characters maybe sensed in improper forms in the successive processes.

SUMMARY OF THE INVENTION

The present invention has been made in consideration of the above situation, and has as its object to obtain an image signal which can be controlled to be a signal of proper level regardless of character density of a document which is an object to be sensed as described above.

It is another object of the present invention to provide an image sensing apparatus capable of obtaining an image signal of proper level when it is sensing a document and a natural picture.

It is still another object of the present invention is to provide an image sensing apparatus capable of sensing a document so that characters can be identified in sensed data even in a case where luminance difference between the characters and background of the document is small.

According to the present invention, since exposure level is not affected by density of characters and drawings in a document when the document including characters and figures is an object to be sensed, an image which is sensed under properly corrected exposure condition can be reproduced. Accordingly, the sensed document image can be clearly seen by bare eyes without applying various of corrections to the sensed document image. Further, if the document is used in an OCR or an edge extracting application, it is possible to increase the rate of success in processes. Therefore, the apparatus of the present invention is quite advantageous in quality and operability. In addition, possibility of failure in sensing an image decreases, thus it is unnecessary to sense the same image many times. Accordingly, recording medium as well as electricity necessary for sensing images will not be wasted.

The foregoing object is also attained by providing an image sensing apparatus having image sensing elements for converting optical image signals representing an image of an object into electrical image signals and constructed so as to generate picture signals on the basis of the electrical image signals in a first mode or to generate high resolution image signals in a second mode, selectively, comprising: detecting means for detecting levels of the electrical image signals; and correction means for correcting either exposure of the image sensing elements or levels of the electrical image signals or both on the basis of levels of the whole electrical image signals whose levels are detected by the detecting means so that the levels of the electrical image signals approach a predetermined target value in the first mode, and for correcting either exposure of the image sensing elements or levels of the electrical image signals or both on the basis of levels of the electrical image signals whose levels are in a predetermined level range so that the levels of the electrical image signals approach the predetermined target value in the second mode.

The foregoing object is also attained by providing an image sensing apparatus having image sensing elements for converting optical image signals representing an image of an object into electrical image signals and constructed so as to generate picture signals on the basis of the electrical image signals in a first mode or to generate high resolution image signals in a second mode, selectively, comprising: detecting means for detecting levels of the electrical image signals; and correction means for correcting either exposure of the image sensing elements or levels of the electrical image signals or both on the basis of levels of the whole electrical image signals whose levels are detected by the detecting means so that the levels of the electrical image signals approach a first target value in the first mode, and for correcting either exposure of the image sensing elements or levels of the electrical image signals or both on the basis of levels of the electrical image signals whose levels are in a predetermined level range so that the levels of the electrical image signals approach a second target value in the second mode.

According to the above two image sensing apparatuses, an image signal of an object sensed under proper exposure condition is obtained only by the user simply switching the modes for sensing a document image and for sensing a picture. As a result, the user does not have to perform complicated operations.

The foregoing object is also attained by providing an image sensing apparatus comprising: image sensing elements for converting optical image signals representing an image of an object into electrical image signals; first average determination means for determining an average value of levels of the electrical image signals; second average determination means for detecting electrical image signals whose levels are higher than the average value determined by the first average determination means and for determining an average value of levels of the detected electrical image signals; and correction means for correcting an iris diaphragm of the image sensing elements so that the average value determined by the second average determination means approaches a predetermined target value.

The foregoing object is also attained by providing an image sensing apparatus comprising: image sensing elements for converting optical image signals representing an image of an object into electrical image signals; clamping means for clamping the electrical image signals to its lowest level; detecting means for detecting levels of the clamped image signal; and control means for controlling gain of the electrical image signals in accordance with the levels detected by the detecting means.

Accordingly, in a case where difference between luminance levels of characters and background is small in a document, as an image of an object, the characters can be clearly distinguished from the background in the reproduced image. Therefore, exposure condition can be properly corrected for sensing various kinds of images, such as a document having black characters on white paper as well as a document having red characters on yellow paper. As a result, characters can be clearly identified.

Further, according to the present invention, effect of noises can be reduced.

Further, according to the present invention, it is possible to set each detection area to be most suitable for a picture mode and for a document mode.

Further, according to the present invention, it is possible to correct exposure condition in accordance with detected levels of an image signal of a whole page of document in the document mode.

Further, according to the present invention, proper exposure condition can be chosen so that the exposure level is not too low in the document mode.

Further, according to the present invention, characters on a document can be sensed under darker environment comparing to environment for sensing a picture. Therefore, it is possible to loosen environmental conditions in which the apparatus of the present invention can sense documents.

Further, according to the present invention, since exposure condition can be corrected based on signal levels of only background parts of a document, characters can be identified regardless of character density in the document.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 11(a) to 11(k) are timing charts explaining an operation according to the sixth embodiment;

FIG. 12 is a block diagram showing the first to sixth embodiments synthetically and conceptually;

FIG. 16 is a flowchart chart showing an operation of the system controller shown in FIG. 13;

FIG. 18 depicts a diagram showing an arrangement of color filters of an image sensing element;

FIGS. 19A, 19B(a) and 19B(b) are conceptual diagrams for explaining arrangements of data stored in a memory.

DETAILED DESCRIPTION OF THE PREFERRED EMBODIMENTS

Before explaining embodiments of the present invention, an image sensing apparatus capable of sensing characters in a document in high resolution and in good condition which is priory applied to the Japanese Patent Office (Japanese Patent Application N 5-269012) by the present inventor will be described as a base of the present invention.

Figure 13:
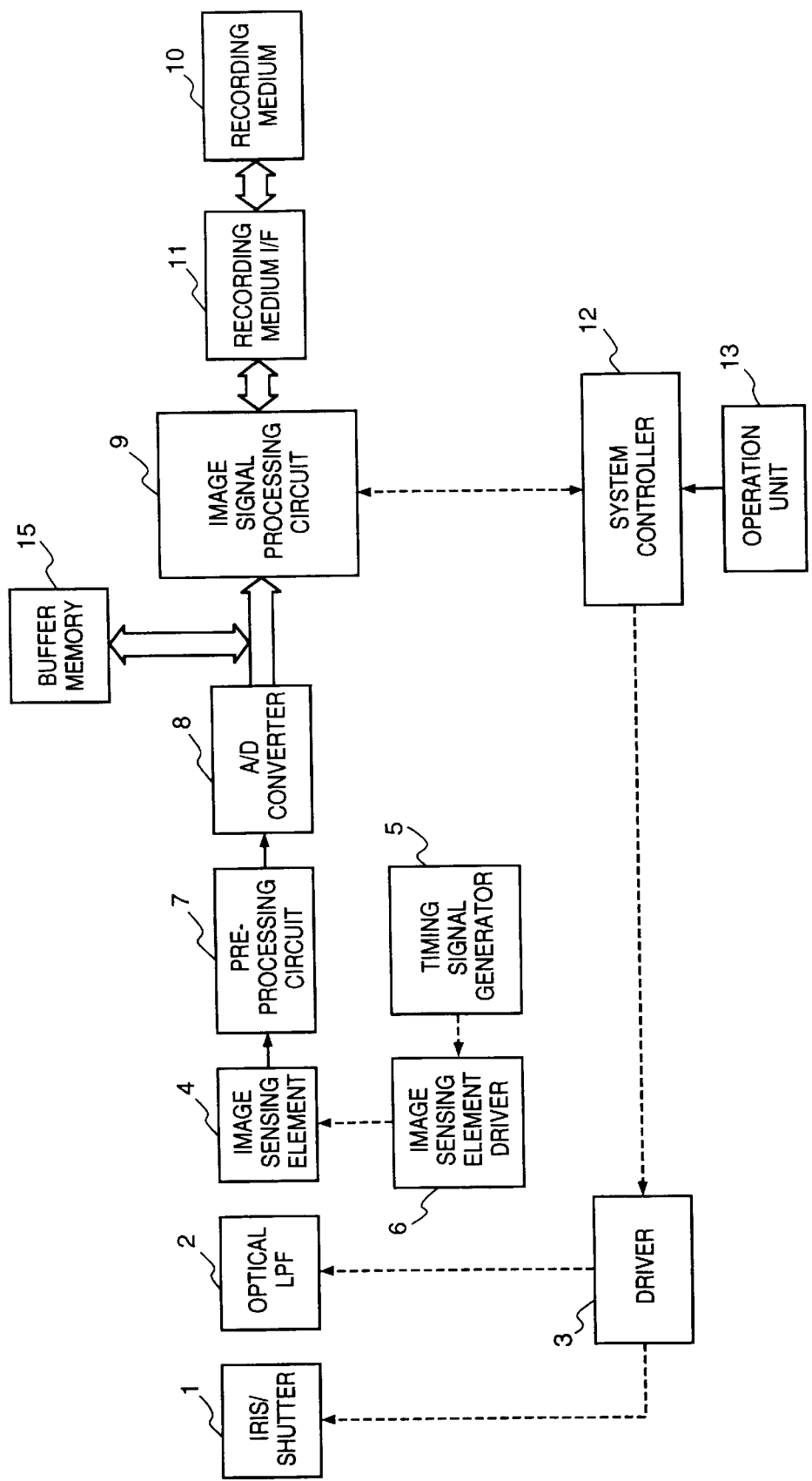
FIG. 13 is a block diagram showing a configuration of an image sensing apparatus to be a base of the present invention.

FIG. 13 is a block diagram illustrating a digital electron camera according to the aforesaid prior application. In FIG. 13, reference numeral 1 denotes an iris/shutter having functions as an iris diaphragm and a shutter; 2, an optical low-pass filter (LPF); 3, a driver for driving each mechanical unit; 4, an image sensing element, such as a CCD, for converting light reflected from an object into an electrical image signal; 5, a timing signal generator for generating timing signals necessary for driving the image sensing element 4; and 6, an image sensing element driver for amplifying the timing signals from the timing signal generator 5 to a level in which image sensing element 4 can be driven.

Further, reference numeral 7 denotes a pre-processing circuit including a CDS circuit and an amplifier for eliminating output noises; 8, an A/D converter; 9, an image signal processing circuit; 10, a recording medium, such as a memory card and a hard disk of PCMCIA standard; 11, a recording medium interface used for recording signals in the recording medium 10; 12, a system controller using CPU for controlling the driver 3, an operation unit 13 which will explained next, and image signal processing circuit 9; 13, the operation unit for externally controlling a camera; and 15, a buffer memory.

Figure 14:
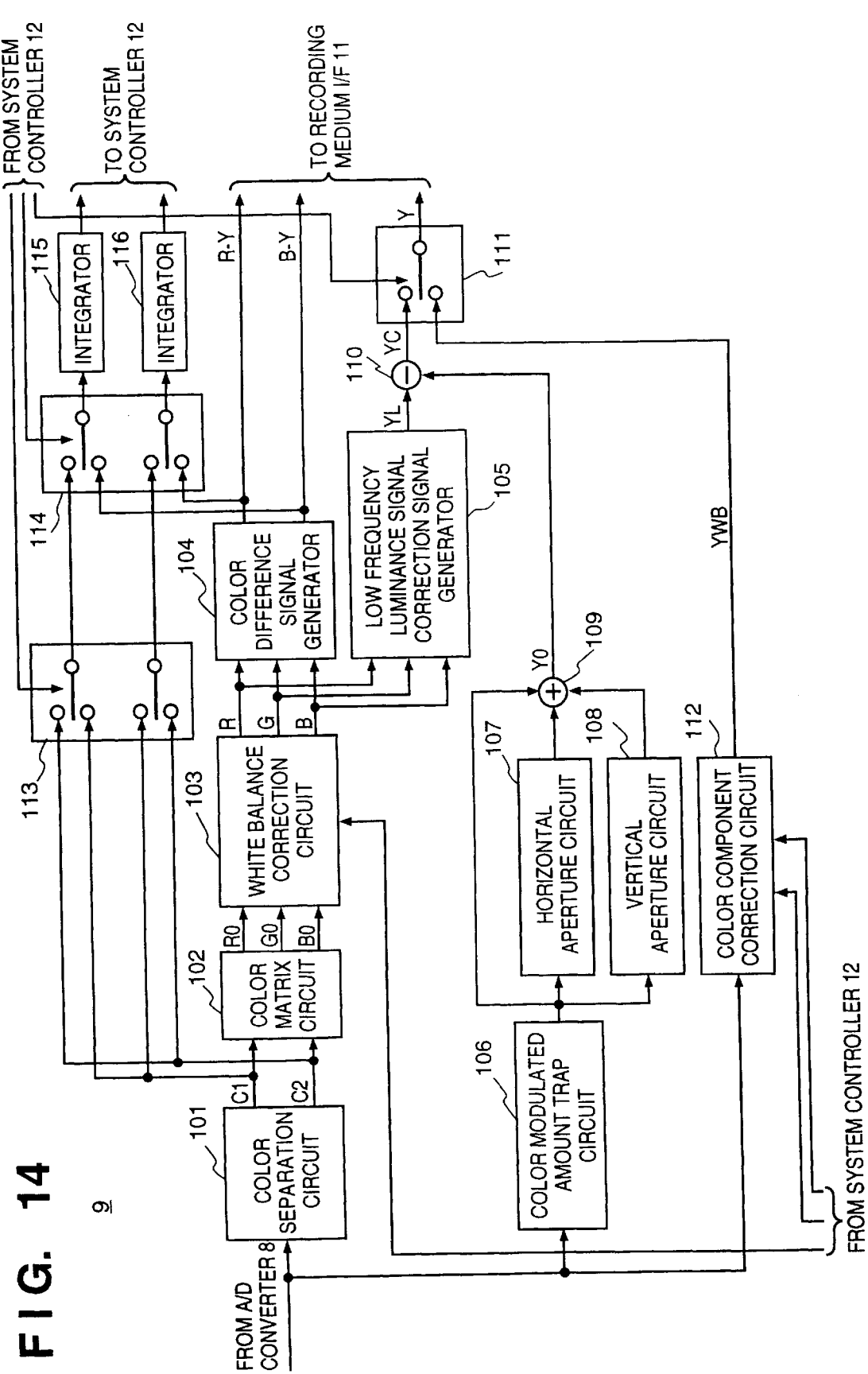
FIG. 14 is a block diagram illustrating a configuration of an image sensing signal processing circuit shown in FIG. 13.

FIG. 14 is a block diagram showing a configuration of the image signal processing circuit 9 shown in FIG. 13. In FIG. 14, reference numeral 101 denotes color separation circuit for separating an A/D converted signal outputted from the image sensing element 4 into signals of each color; 102, a color matrix circuit for generating RGB signals from the color-separated signals; 103, a white balance correction circuit for correcting the RGB signals in accordance with color of light illuminating an object; 104, a color difference signal generator for generating color difference signals, R-Y and B-Y, from the white-balanced RGB signals; 105, a low frequency luminance signal correction value signal generator for generating a signal for correcting color component difference of luminance signals on the basis of the white-balanced RGB signals.

Further, reference numeral 106 denotes a color modulated amount trap circuit for deleting color modulation signal superposing on the A/D-converted image signal; 107, a horizontal aperture circuit for enhancing outlines in the horizontal direction; 108, a vertical aperture circuit for enhancing outlines in the vertical direction; 109, an adder for adding each signal;, 110, a subtractor, 111, a switch, consists of a multiplexer and the like, for selecting an output out of two inputs in accordance with an image sensing mode; 112, a color component correction circuit for performing level correction on the A/D converted image signal by each pixel; 113 and 114, switches composed of two input multiplexers of two channels; and 115 and 116, integrators for calculating an average of signals.

Figure 15:
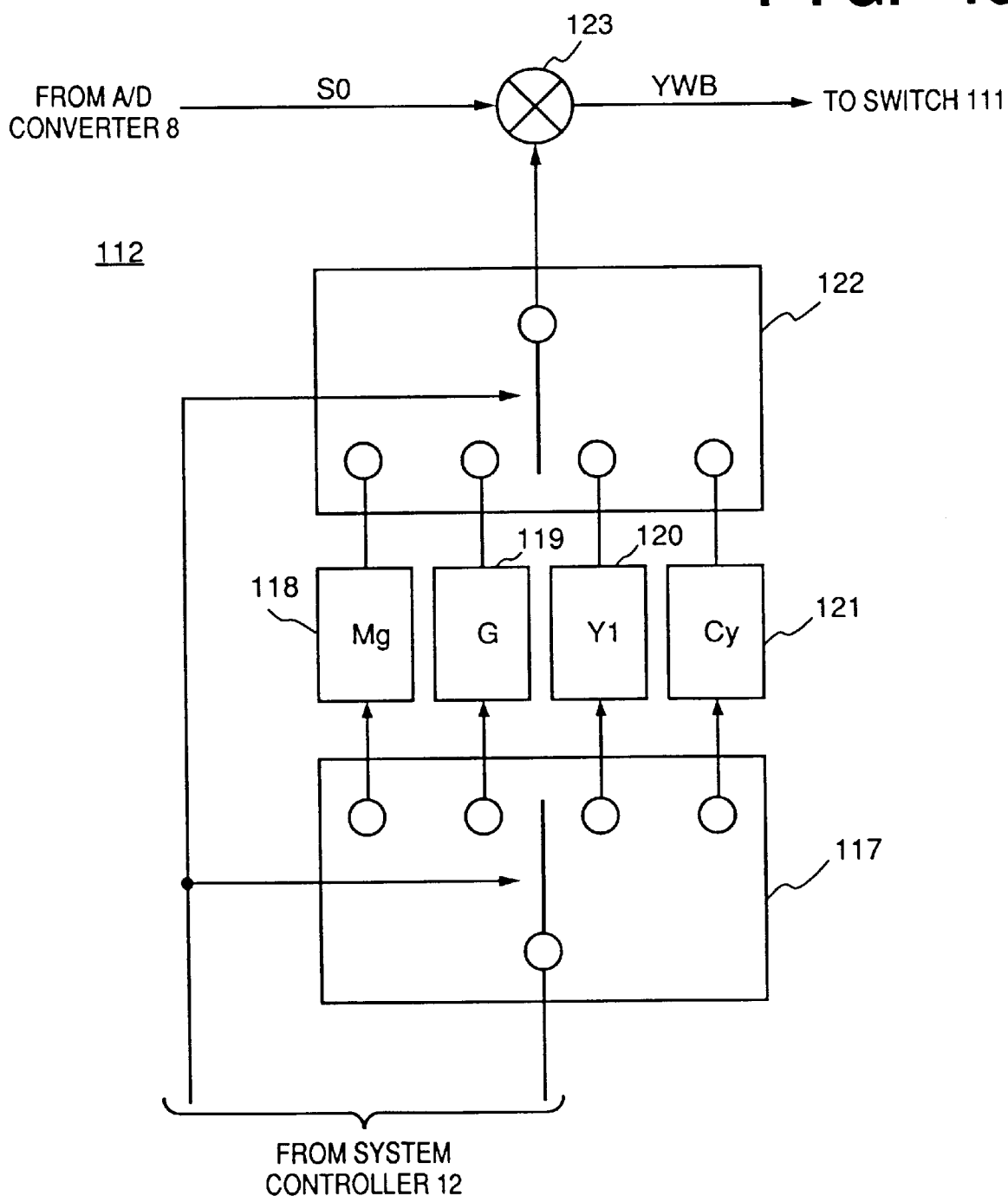
FIG. 15 is a block diagram illustrating a configuration of a color component correction circuit shown in FIG. 14.

FIG. 15 is a block diagram illustrating a configuration of the color component correction circuit 112 shown in FIG. 14. In FIG. 15, reference numeral 117 denotes a switch, consists of a demultiplexer and the like, for distributing data sent from the system controller 12; 118 to 121, shift registers for temporary storing correction amount for each color component; 122, a switch composed of a multiplexer for selecting a single output out of four inputs; and 123, a multiplier.

Figure 17:
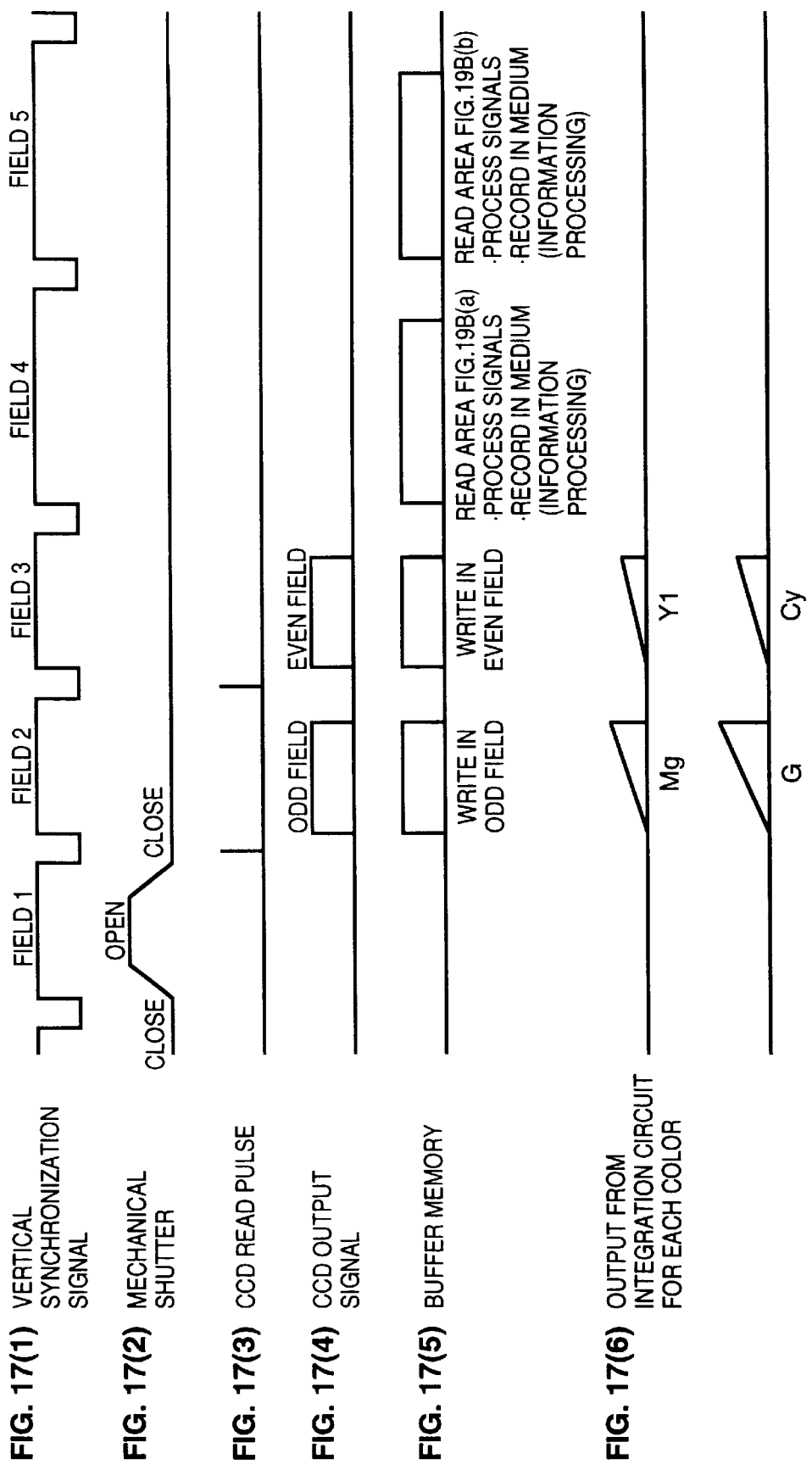
FIGS. 17(1) to 17(6) are timing charts for explaining the operation of the system controller shown in FIG. 13.

FIG. 16 is a flowchart showing an operation of the system controller 12, FIGS. 17(1) to 17(6) are timing charts for explaining the same, and FIG. 18 is a diagram showing a filter arrangement of complimentary colors used in the image sensing element 4. In FIG. 18, Mg is for magenta, G is for green, Cy is for cyan, and Yl is for yellow. FIGS. 19A, 19B(a) and 19B(b) are conceptual diagrams showing memory areas of the buffer memory 15 where each color component data of the image signal are written.

An operation will be explained with reference to above figures.

First, a user selects whether to perform a normal picture sensing (mode to sense a picture is called "a picture mode", hereinafter) or to perform a high resolution sensing on a monochromatic object, such as a document (mode to sense a document is called "a document mode", hereinafter. Note, it is exceptionally referred to as "a monochromatic mode" at step S101 in FIG. 16.) by the operation unit 13. When the picture mode is selected, the switch 111 selects a signal YC, and a normal operation for sensing a picture is performed at step S102.

Whereas, when the document mode is selected, the switch 111 selects a signal YWB. First at step S103, after moving the optical low pass filter 2 out of a image signal path by driving the driver 3 under control of the system controller 12, each circuit is powered on at step S104. Next at step S105, iris/shutter 1 is opened and the image sensing element 4 starts to expose. After the iris/shutter 1 has been opened for a predetermined exposure time set by a light measuring means (not shown), it is closed at step S106. The exposure operation is performed during a period of field 1 in FIG. 17(1). After the iris/shutter 1 is closed completely, an output signal (image signal) is read from the image sensing element 4 at step S107. As shown in FIG. 18, the signal is outputted alternatively from an ODD field and from an EVEN field of the image sensing element 4. As a result, the output signal from the ODD field is a pixel-sequential signal of Mg and G. It should be noted that the order of Mg and G changes by every 1H (a period in which a horizontal synchronization signal is "HIGH").

As described above, the signal outputted from the ODD field of the image sensing element 4 is transferred to the buffer memory 15 via the pre-processing circuit 7 and the A/D converter 8. Then as shown in FIG. 19A, the read signals are interlaced and stored in a memory map of the buffer memory in such a manner that after signals are stored for 1H, an area starting at the next address is kept empty for 1H, then signals are stored from the next address area for 1H.

As described above, the image signals are stored in the memory map and inputted in the image signal circuit 9 at the same time. In the image signal processing circuit 9, the image signals are separated into two kinds of signals, C1 and C2, which are color signals of a single color by color separation circuit 101. Regarding a signal outputted from the ODD field, the C1 signal is a line-sequential signal of Mg and G after the process at step S107. In contrast, the C2 signal is a line-sequential signal of G and Mg. Further, the C1 and C2 signals are inputted into the switch 113 and, by switching the switch 113 by the system controller 12 at every 1H, the signals, on two paths, to be outputted from the switch 113 become a G signal and a Mg signal, respectively.

The Mg signals and G signals are inputted into the integrators 115 and 116 via the switch 114, if the switch 114 is selected the output of the switch 113 under control of the system controller 12. At step S108, the integrators 115 and 116 find average levels of signals of each color in a frame area or of a part of the image (refer field 2 in FIG. 17(1)), and the average levels are inputted into the system controller 12. At step S109, the system controller 12 calculates correction values to make signal levels of Mg and G equal to a predetermined value (e.g., when the maximum level is considered as 100%, a signal level corresponding to 50% of the maximum level) on the basis of each integration information of the Mg and G signals. For example, if the integrated signal level of G is 25% of the maximum level, 6 dB is induced as a value to be corrected.

Next at step S110, a signal in the EVEN field is outputted. The signal to be outputted is a pixel sequential signal of Cy and Yl as shown in FIG. 18.

The image signal outputted from the image sensing element 4 as above is transferred to the buffer memory 15 via the pre-processing circuit 7 and the A/D converter 8 as for the pixel sequential signals of Mg and G. Then, as described in FIGS. 19B(a) and 19B(b), the signals are stored in the empty address areas of the memory map by 1H.

As described above, the image signal outputted from the EVEN field is stored on the memory map and inputted into the image signal processing circuit 9 at the same time. In the image signal processing circuit 9, the image signals are separated into two kinds of signals, C1 and C2, each of which is color signal of a single color by the color separation circuit 101. Regarding the signal outputted from the EVEN field, the C1 signal is changed to a Yl signal, and the C2 signal is changed to a Cy signal by the process at step S110. Since the C1 and C2 signals are not alternated between Yl and Cy signals as line-sequential signals, it is unnecessary to change over the switch 113. Next, each color signal C1 and C2 enters the integrator 115 and 116 via the switch 114 which selected the output of the switch 113 under control of the system controller 12. The integrator 115 and 116 calculates averages of signals of each color in a frame area or in a part of it (refer field 3 in FIG. 17(1)), and the average values are inputted into system controller 12 at step S111. At step S112, the system controller 12 calculates correction values to make signal levels of Yl and Cy equal to predetermined values (e.g., when the maximum level is considered as 100%, then a signal level corresponding to 50% of the maximum level) on the basis of information of integrated values of Yl and Cy signals. For example, if the integrated signal level of Cy is 25% of the maximum level, 6 dB is induced as an amount to be corrected. Note that the level correction of color filters is performed by each color of Mg, G, Cy, Yl in the above embodiment. However, since there are a case where Cy is in above and below Mg and G and a case where Yl is in above and below Mg and G, actual color separation sensitivities in the two cases differs from each other, thus it is more effective to calculate correction values for G and Mg separately and to perform corrections on G and Mg separately.

Each correction data indicating correction amount which is calculated as above is inputted to the color component correction circuit 112 of the image signal processing circuit 9 under control of the system controller 12. In the color component correction circuit 112, signal correction data of each color is stored in corresponding registers 118 to 121 by the switch 117 which is controlled and changed by the system controller 12. After the correction data is set as described above, data is read out from an area shown in FIG. 19B(a) of the buffer memory 15, and inputted into the image sensing processing circuit 9 (during field 4 in FIG. 17(1)). In the image signal processing circuit 9, the image signal enters the color component correction circuit 112. In the color component correction circuit 112, an image signal S0 enters a multiplier 123, and multiplication coefficients to be used there are assigned with correction data stored in the register 118 to 121 corresponding to color signals by switch 112 which can be changed over under control of the system controller 12. Thereby, color components of the image signal S0 are corrected in accordance with an average signal of each color calculated in the integrators 115 and 116. By this correction, if the object to be sensed is a monochromatic object, signal levels of all the pixels are to be the same.

A signal YWB which is corrected as above is selected by the switch 111, and recorded on the recording medium 10 as a Y signal sent via a recording medium I/F 11. Or, it is sent to a host computer via a personal computer interface (not shown), and is applied with processes, such as filing process of image information and recognition process of character information (during field 4 in FIG. 17(1)).

Next at step S115, image data is read out from an area in FIG. 19B(b) of the buffer memory 15, and inputted into the image signal processing circuit 9 (during field 5 in FIG. 17(1)), similarly to the signal from the area in FIG. 19B(a). In the image signal processing circuit 9, the image signal enters the color component correction circuit 112. In the color component correction circuit 112, the image signal S0 enters the multiplier 123, and multiplication coefficients to be used there are assigned with correction data stored in the register 118 to 121 corresponding to color signals by switch 122 which can be changed over under control of the system controller 12. Thereby, color components of the image signal S0 are corrected in accordance with an average signal of each color calculated in the integrators 115 and 116. By this correction, if the object to be sensed is monochromatic, signal levels of all the pixels are to be the same.

A signal YWB which is corrected as above is selected by the switch 111, and recorded on the recording medium 10 as a Y signal sent via a recording medium I/F 11. Or, it is sent to a host computer, and is applied to processes, such as filing process of image information and recognition process of character information (during field 5 in FIG. 17(1)).

As described above, by setting the document mode, and, when the document mode is selected, by moving the optical low pass filter 2 out of a signal path, and by using the signal, whose color component data of each pixel are corrected, as a luminance signal, a signal in high resolution can be obtained. Accordingly, when a documents including characters and figures are sensed, image information in very high quality can be obtained.

Further, it is possible to send a signal read by interlacingly from an image sensing element in a non-interlaced manner, and sequentially send a signal from the top of an image to an information device without adding any circuit specific for the above operation. Therefore, it is very advantageous when a process, such as a character identifying process, which requires information in high resolution, is performed in the information device.

It should be noted that, in the picture mode at step S102, the adder 109 adds an image signal from which color modulated amount is removed and which is outputted from the color modulated amount trap circuit 106 and a signal obtained by processing the above image signal with aperture correction by the horizontal aperture circuit 107 and the vertical aperture circuit 108, thus obtaining a signal Y0 whose outlines are enhanced. This signal Y0 is subtracted by the luminance correction signal YL from the low frequency luminance signal correction signal generator 105 in the subtractor 110, thereby obtaining a signal Yc. The signal Yc is selected as a signal Y by the switch 111, and stored in the recording medium 10 via the recording medium I/F 11.

Whereas, the signals C1 and C2 separated in the color separation circuit 101 become signals R0, G0 and B0 in the color matrix circuit 102, further converted into RGB signals after passing a white balance correction circuit 103, then converted into the color difference signals R-Y and B-Y in the color difference signal generator 104, and finally stored in the recording medium 10 via the recording medium I/F 11.

Figure 20:
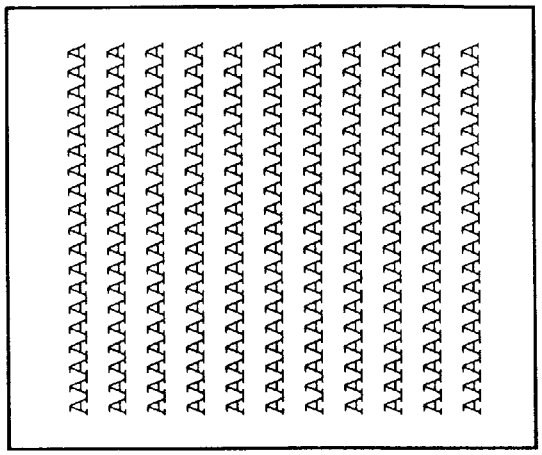
FIGS. 20(1) to 20(3) show examples of documents, as objects, to be sensed.
Figure 20:
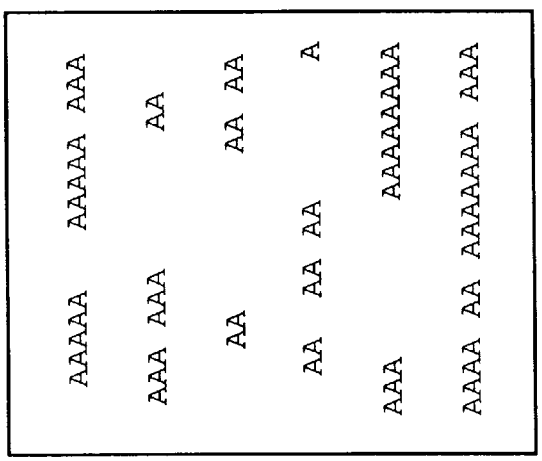
Figure 20:
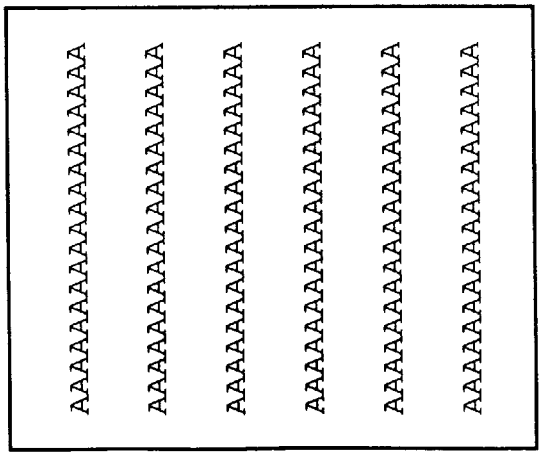

In the above-described image sensing apparatus which is priory suggested, in the light measuring means, light exposure of the image sensing element is decided in accordance with a value obtained by integrating light quantity of the object in the area for photometry by using a photometry sensor. With this configuration, exposure conditions can be almost properly controlled when a picture is to be sensed. However, when a document is to be sensed, since proper light exposure is changed depending upon character density of the document, the exposure conditions can not be controlled properly. For example, assuming that proper exposure is operated when a document, as shown in FIG. 20(1), having normal character density is sensed, then a document, shown in FIG. 20(2), having low character density will be exposed a little too bright. On the other hand, a document, as shown in FIG. 20(3), having high character density will be exposed not bright enough.

Next, on the basis of the above-described technique, the present invention will be described in detail.

<First Embodiment>

Figure 1:
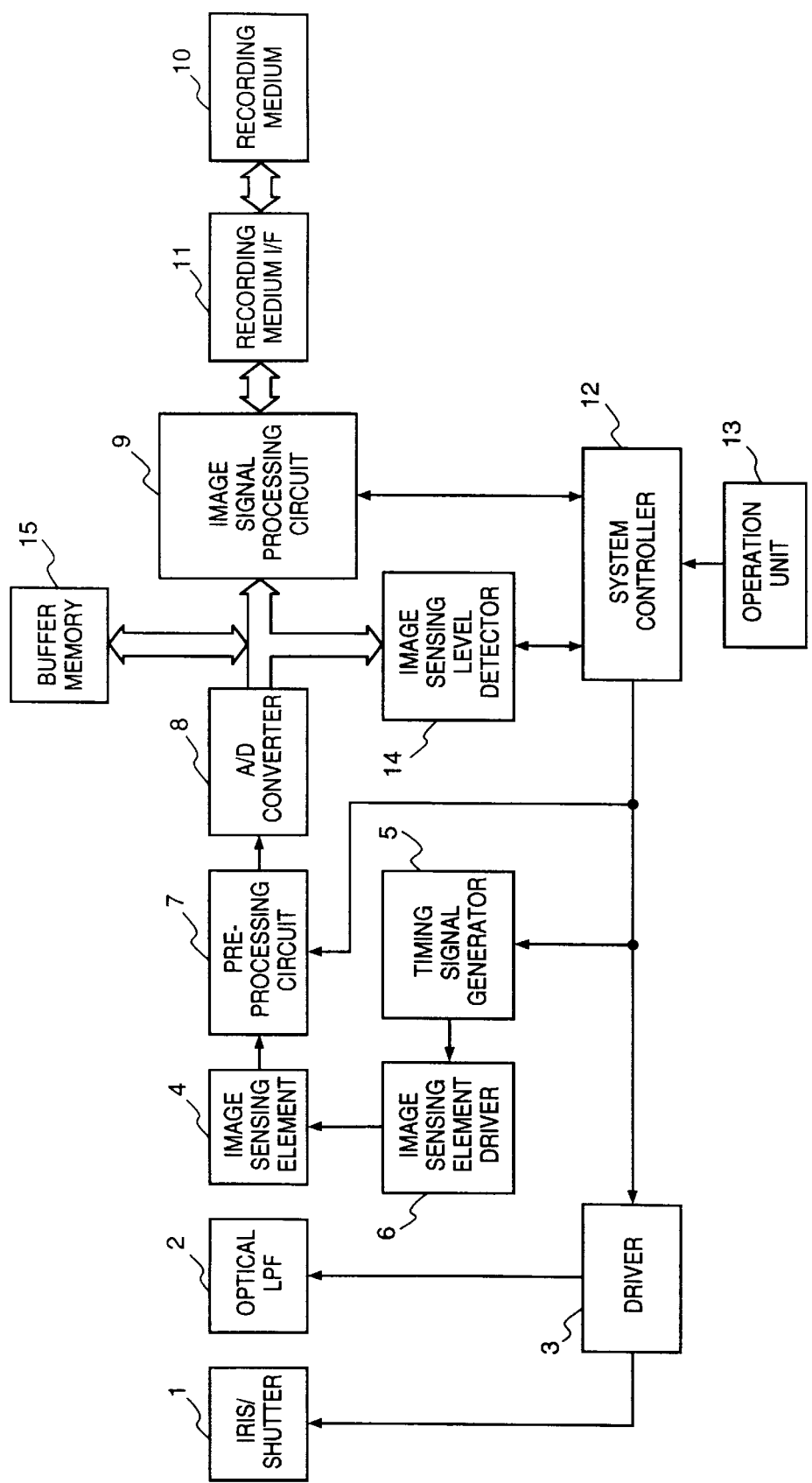
FIG. 1 is a block diagram illustrating a configuration of an image sensing apparatus according to a first embodiment.
Figure 2:
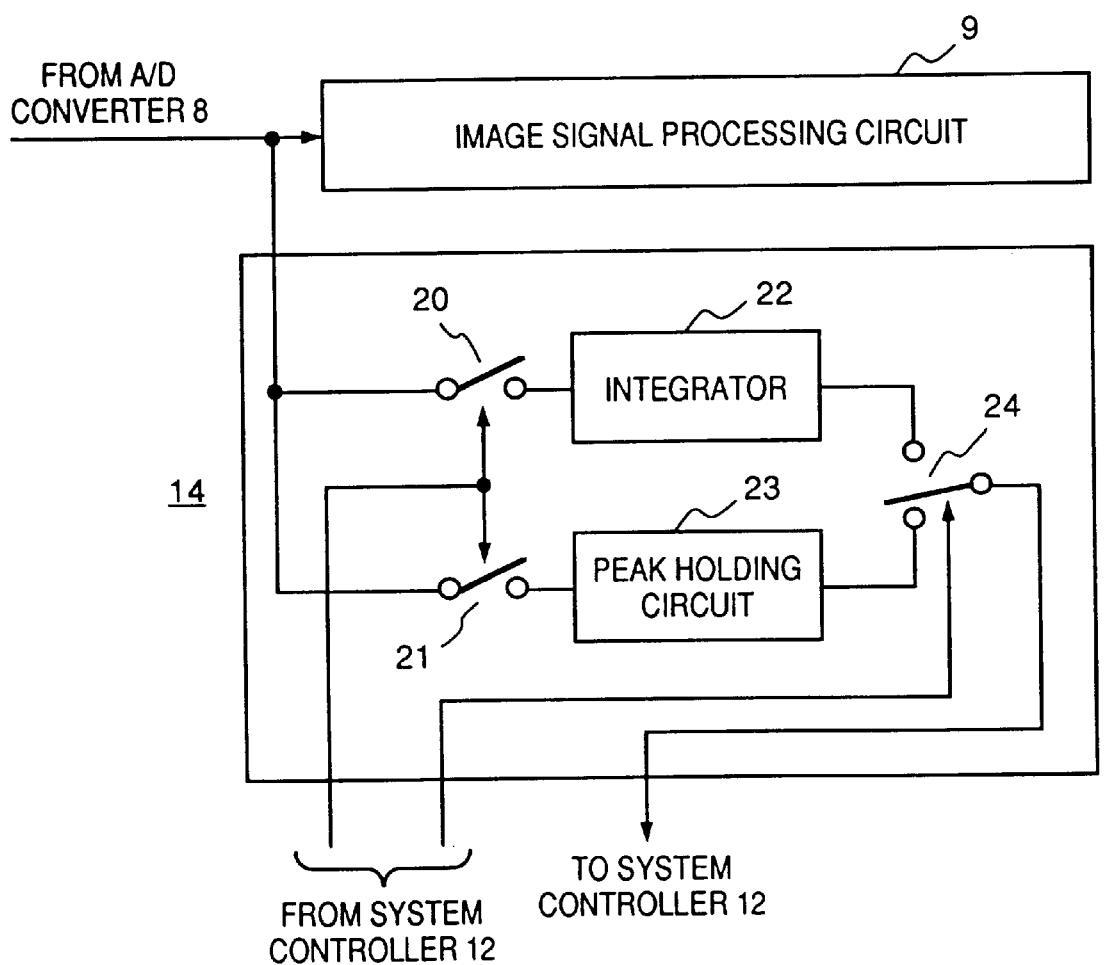
FIG. 2 is a block diagram illustrating a configuration of an image sensing level detector.
Figure 3:
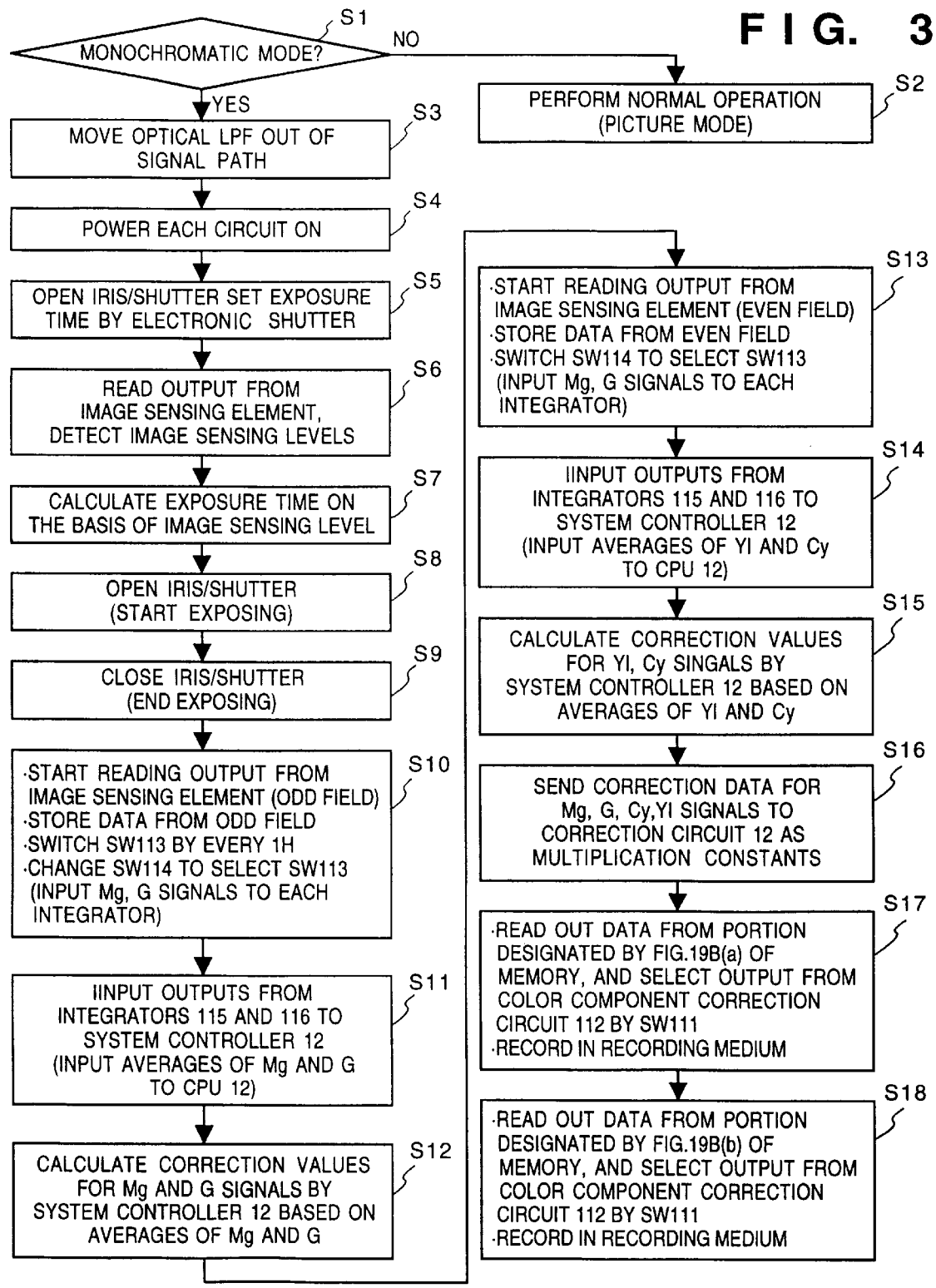
FIG. 3 is a flowchart explaining an operation according to the first embodiment.

FIG. 1 is a block diagram illustrating a configuration of an image sensing apparatus according to a first embodiment of the present invention. In FIG. 1, reference numeral 14 denotes an image sensing level detector for detecting output level of the image sensing element 4. The other circuits and elements are the same as those in FIG. 13. FIG. 2 is a block diagram illustrating a configuration of image sensing level detector 14 shown in FIG. 1. In FIG. 2, reference numerals 20 and 21 denote switches for controlling transmission of signals; 22, an integrator for integrating image signal levels corresponding to each pixel; 23, a peak holding circuit for holding the maximum value of an image signal corresponding to each pixel; and 24, a selector for selecting a signal out of two input signals. FIG. 3 is a flowchart showing an operation of the first embodiment.

The operation of the first embodiment will be described below.

At step S1 in FIG. 3, a user selects either the picture mode or the document mode (monochromatic mode) using the operation unit 13. When picture mode is selected, a normal image sensing operation is performed at step S2.

In a case where document mode is selected, when an instruction for sensing an image is inputted from the operation unit 13, the optical low pass filter 2 is moved out of the signal path at step S3, and circuits are powered on at step S4. Then at step S5, the iris/shutter 1 is opened, and the image sensing element 4 is exposed with light from the object for a required amount of time by an electron shutter. At step S6, electrical charge of the signals obtained by the exposure are read, and data of the electrical charge is inputted into the A/D converter 8 via the pre-processing circuit 7, as for the above-described conventional apparatus. The image signal which is converted to a digital signal is inputted into the image sensing level detector 14, and the image sensing levels detected by the image sensing level detector 14 are sent to the system controller 12.

The system controller 12 decides exposure time of the image sensing element 4 on the basis of the image sensing levels detected as above. Further, it controls the timing signal generator 5 to change the exposure time by the electron shutter, and also controls the driver 3 to change iris diaphragm so that the image sensing element 4 is properly exposed. Operations at the successive steps S8 to S18 are the same as steps S105 to S115 in FIG. 16, respectively.

Next, an operation of the image sensing level detector 14 will be described in detail with reference to FIG. 2. The image signals digitized by the A/D converter 8 are inputted into the switches 20 and 21, and inputted into the integrator 22 or the peak holding circuit 23 for a time designated by the system controller 12 in dependence upon the selected image sensing mode.

Figure 4A:
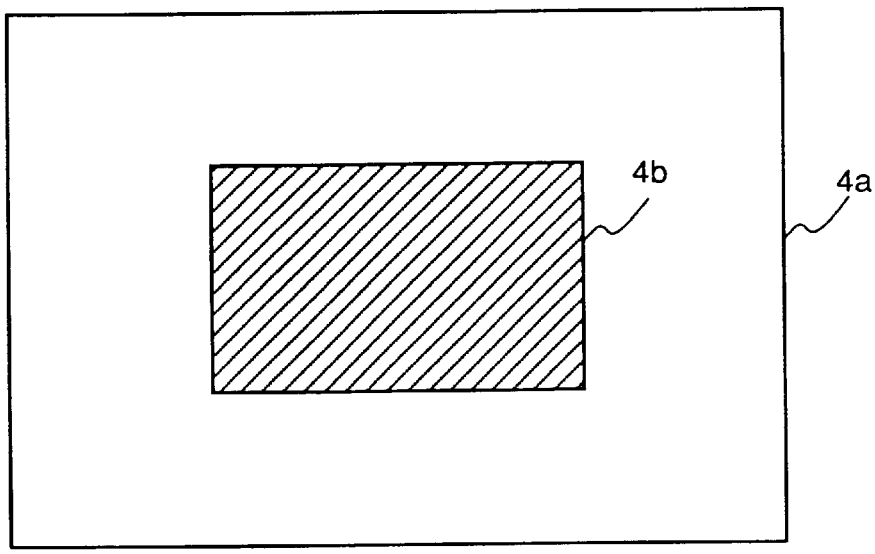
FIG. 4(A) is a diagram.
Figure 4B:
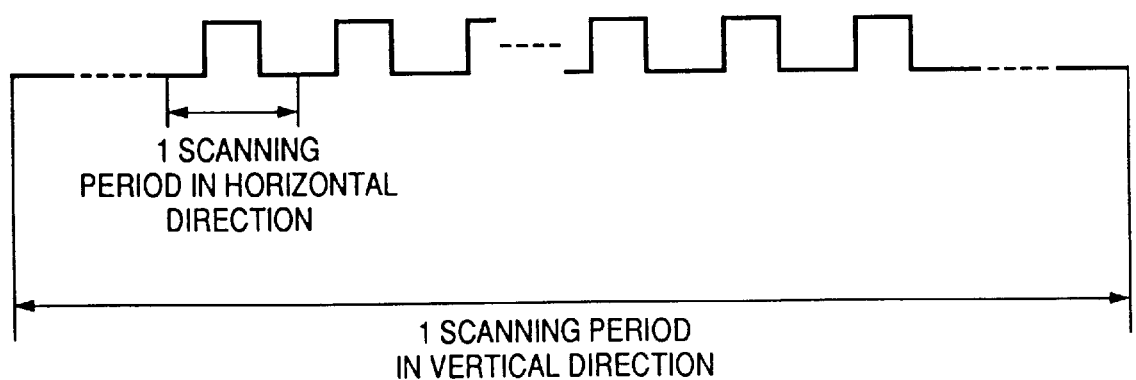
FIG. 4(B) is a timing chart for explaining an operation according to the first embodiment.

The above-said designated time period is explained referring to FIGS. 4(A) and 4(b). FIG. 4(A) shows a valid pixel area 4a in an image sensing surface of the image sensing element 4 and a detection area 4b, distinguished with diagonal lines, which is actually used for detecting the image sensing levels in the valid pixel area 4a. FIG. 4(B) shows how signals in the detection area 4b are selected by a timing signal. More specifically, it shows that high-level periods in FIG. 4(B) are periods for outputting an image signal corresponding to the detection area 4b, and the system controller controls so that the switches 20 and 21 are "ON" only during these periods. Accordingly, light exposure for a main object in an image can be properly set.

Note that the detection area 4b can be changed, e.g., size, position, and so on, controlled by the operation unit 13. In that case, it is possible to make the detection area 4b most suitable for the picture mode and the document mode in detection of image sensing levels. More specifically, when the picture mode is selected, the central area of the valid pixel area 4a is used as the detection area 4b, as shown in FIG. 4(A). Whereas, when the document mode is selected, a document or the like, which is the main object, is a frame image. In such a case, by choosing the whole frame as the detection area 4b, more proper image sensing can be performed. Further, since it requires considerable time to calculate all pixel signals inside of the detection area 4b to obtain the image sensing levels, it is possible to pick up sample points discretely in the detection area 4a so as to reduce number of samples to be calculated.

As described above, signals in a sample area or areas (an area or areas from which data is taken as samples) are selected, and inputted to the integrator 22 and the peak holding circuit 23. The integrator 22 integrate signal levels in the sample area or areas, and calculates and outputs their average value. The peak holding circuit 23 selects the brightest peak level or levels near the peak level in the sample area or areas, and outputs the selected value. Above two outputs enter the selector 24. Then, under control of the system controller 12, when the document mode is selected, the output from the peak holding circuit 23 is selected, whereas the picture mode is selected, the output from the integrator 22 is selected, and sent to the system controller 12. The system controller 12 calculates the exposure time on the basis of the detected image sensing levels as described above. For example, assuming that a saturation level of an image signal for the A/D converter 8 to output be 100, then, by adjusting the exposure conditions so that the image sensing level is to be the target value, 35, the image sensing element 4 can be properly exposed.

As described above, by changing methods for detecting image sensing level for controlling exposure time depending upon the document mode or the picture mode, selected by a user, namely, by using either the output from the integrator 22 or the output from the peak holding circuit 23, most suitable exposure condition can be controlled when either mode is selected. Especially, in the document mode, the signal peak level of an image is detected and exposure conditions are controlled in accordance with the value of the signal peak level. Thereby, exposure correction can be performed based on background of a document or the like (portions other than characters), and proper exposure correction which makes characters to be efficiently identified regardless of character density.

<Second Embodiment>

Figure 5:
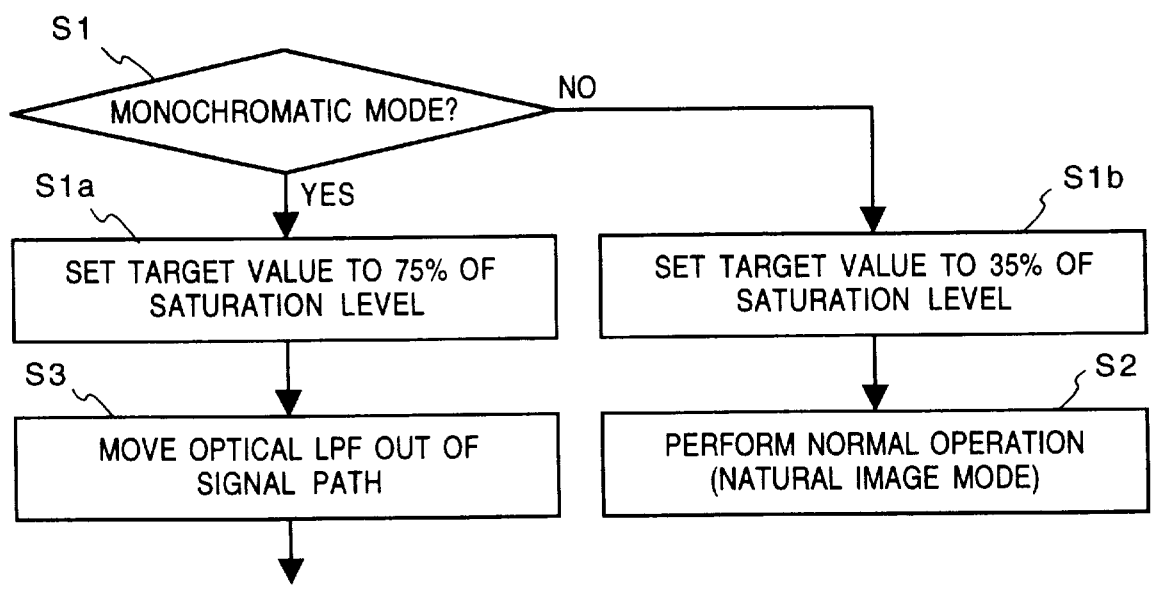
FIG. 5 is a flowchart for explaining a second embodiment.

In the above first embodiment, the image sensing element is exposed with such light exposure that detected level by the image sensing level detector 14 is the target value, 35, with respect to the saturation level, 100. In this case, the same target value for the picture mode and for the document mode is set, thus the image sensing element is exposed properly in the picture mode, however, the image sensing element will not be exposed enough in the document mode. Accordingly, by selecting target value of the detection level, 35, in the natural mode, and 75, in the document mode by the system controller 12, for instance, image sensing can be performed under proper exposure conditions in both modes. FIG. 5 is a flowchart showing an operation of the system controller 12 for setting the target values. This flowchart is almost the same as shown in FIG. 3, but steps S1a and S1b added after S1. In the picture mode, the target value is set to 35 at step S1b, whereas the target value is set to 75 in the document mode at step S1a.

Further, the characteristics of non-linear processing unit during processing signals can be changed by switching modes, considering that, if the target value is changed in the document mode, non-linear characteristics during processing signals are not proper.

Further, the target value can be not only set in advance in an image sensing apparatus, but also changed freely by storing the values in a nonvolatile memory in the system controller 12 by external operation. In this case, exposure levels in the document mode and in the picture mode can be freely set in accordance with user's intention.

<Third Embodiment>

Figure 6:
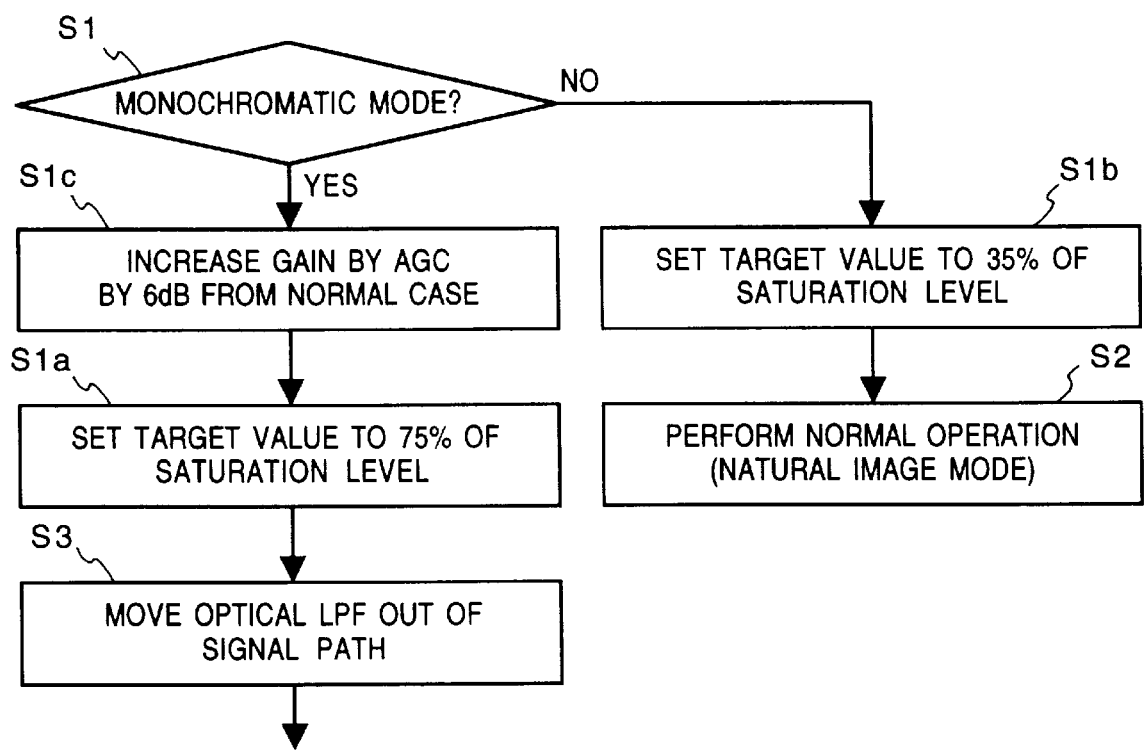
FIG. 6 is a flowchart for explaining a third embodiment.

In the document mode, it is not necessary to consider color noises since it is reproduced in black and white, further it is possible to perform binarization and removal of noises by changing characteristics of a non-linear circuit. Thus, there is a case where a little higher noise level in the document mode than in the picture mode is acceptable when signals have not been processed. This feature is taken into consideration in this embodiment, and gain in an AGC circuit (not shown) in the pre-processing circuit 7 in the document mode is increased by 6 dB comparing to a normal case. FIG. 6 is a flowchart for explaining the third embodiment of the present invention. In the above first and second embodiments, gain in the pre-processing circuit 7 is fixed in the picture mode and in the document mode. On the contrary, in the third embodiment, as shown in step S1C in FIG. 6, gain setting is changed in the document mode, and increased by 6 dB, for instance, comparing to the gain in the picture mode.

By setting as above, sensitivity of the image sensing apparatus in the document mode is increased by 6 dB, thereby image sensing operation can be performed in darker circumstances in the document mode than in the picture mode. The gain can be other than 6 dB. Further, it is not necessary to increase the sensitivity when sensing a bright object, however, it is more effective to increase the sensitivity when brightness of a document becomes lower than a predetermined value, which causes a S/N ratio of a bright document to increase. In a case where brightness of a document becomes lower than a predetermined value, by gradually increasing gain, it is possible to sense the document in the best S/N condition.

<Fourth Embodiment>

Figure 7:
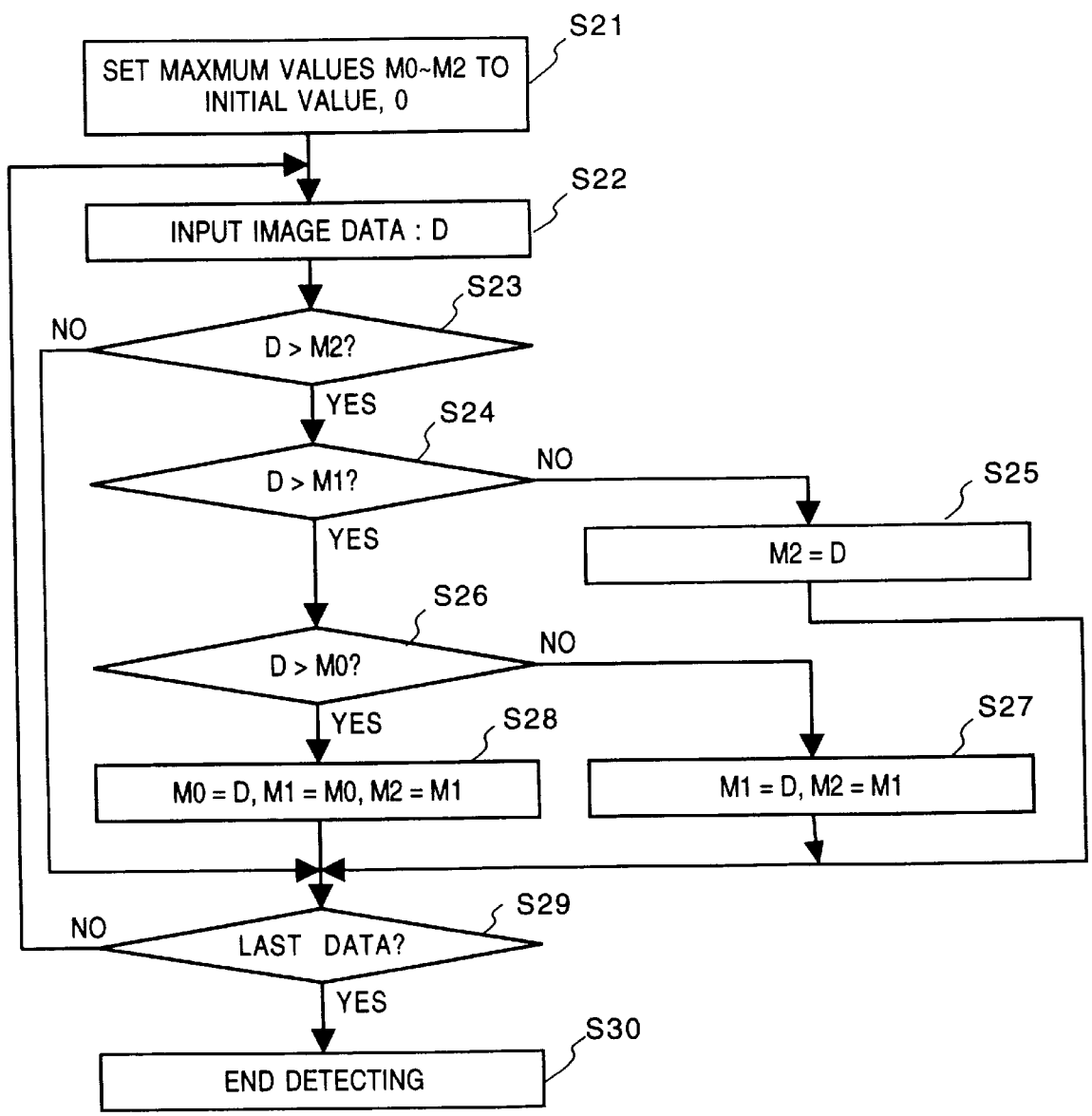
FIG. 7 is a flowchart for explaining a fourth embodiment.

In the second embodiment, exposure conditions are controlled only on the basis of the peak signal level. However, the exposure control can be performed on the basis of not only the peak signal level, but also a signal level which is obtained by averaging several highest signal levels. Further, the peak signal level is detected by the peak holding circuit 23 in the image signal processing circuit 9, but the similar operation can be performed in the system controller 12 after an image signal is directly inputted to the system controller 12. This embodiment is described referring to FIG. 7.

At step S21, as initialization of the system controller 12, initial data M0, M1, and M2 are set to 0. Next at step S22, an A/D-converted image data is inputted into the system controller 12. This data is referred as "D", hereinafter. At step S23, the values of inputted data D and M2 are compared. If the data D is less or equal to M2, then it is checked whether or not the data is the last data at step S29. This process is for confirming whether the entire image signal representing all the detection area has been read. If D is the last data, the process proceeds to step S30 and the detection process is over. If it is not, the process goes back to step S22 where other image data is read.

Whereas, if the data D is greater than M2 at step S23, then it is further compared with M1 at step S24. If it is determined that D is less or equal to M1, then M2 is replaced by D at step S25 since D is the third highest level among the data having been processed up to this point. After replacing M2 by D, the process moves to step S29 where D is checked whether or not it is the last data, similarly to the above described case. If D is greater than M1 at step S24, then it is compared with M0 at step S26. If D is less or equal to M0, then it is determined that D is the second highest level, and M2 is replaced by M1 and M1 is replaced by D at step S27. Thereafter, the process moves to step S29. Whereas, if D is greater than M0, then it is determined that D is the highest level amount data having processed up to this point. Accordingly, at step S28, M2 is replaced by M1, M1 is replaced by M0, and M0 is replaced by D.

According to the above operation, The three brightest data among the image data in the detection area can be held. By deciding exposure conditions on the basis of the average of the three brightest data, the exposure conditions can be controlled more properly. For example, in a case where an operation is performed on the basis of only a single peak level, a noise level in the signal may be detected as the peak level, and improper exposure conditions may be set if the peak level is used. According to the fourth embodiment, this trouble can be avoided.

Note that, in the fourth embodiment, three data are detected, however, the number of data to be detected can be any as far as it is greater or equal to 2. In order to more efficiently avoid troubles caused by noises, about 30 to 70 data would be proper.

Further, some brightest signals of the detected data may be ignored to find a final average. Accordingly, when there is a very bright portion, a reflecting portion of a light source, in a document or when other noises are in the document, it is possible to avoid effects caused by them, and to perform proper exposure corrections.

<Fifth Embodiment>

Figure 8:
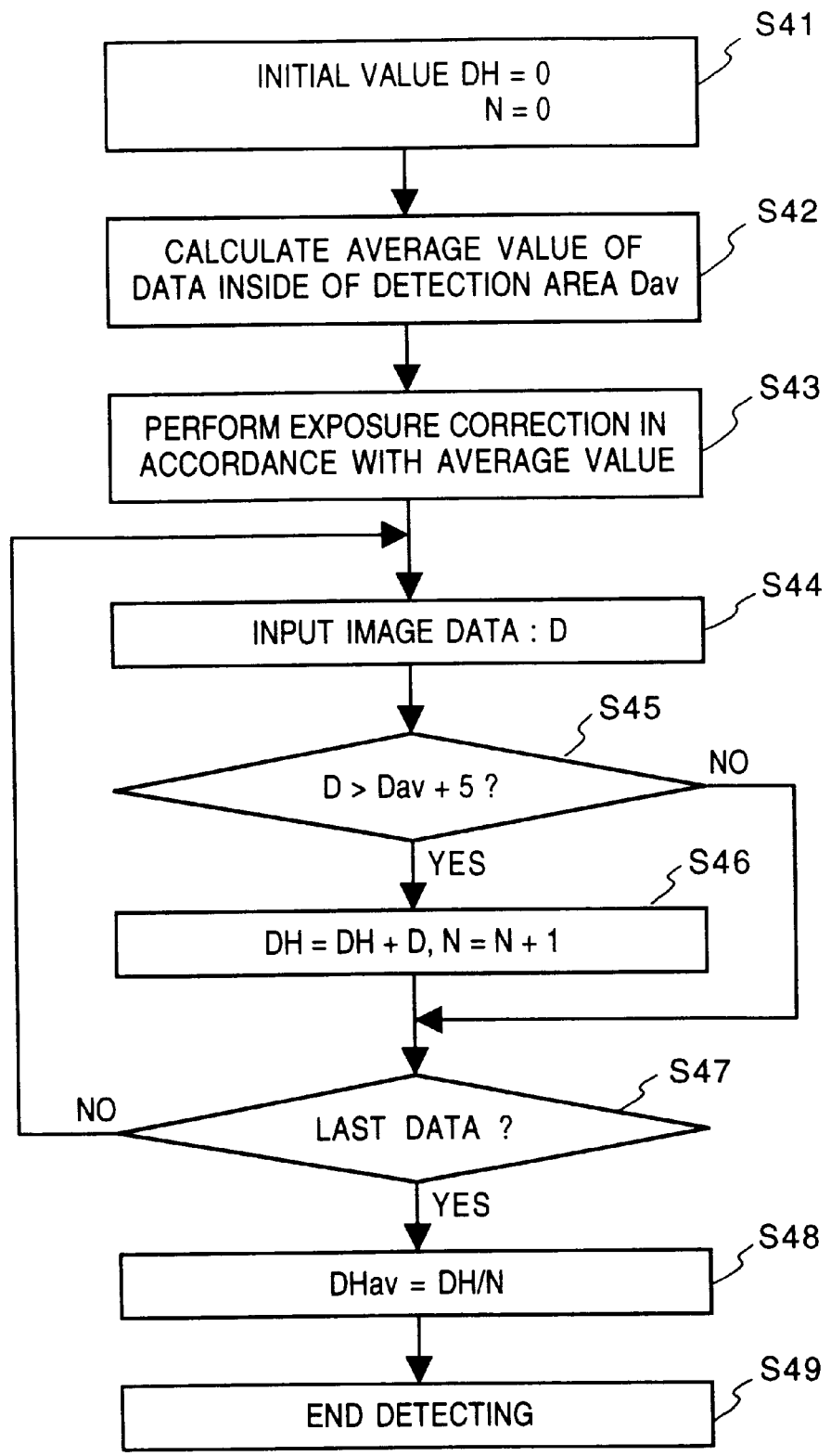
FIG. 8 is a flowchart for explaining a fifth embodiment.

FIG. 8 is a flowchart for explaining a fifth embodiment.

At step S41 in FIG. 8, DH and N are initially set to 0. Next at step S42, an average Dav of image data in the detection area is calculated. This average can be an output from the integrator 22 in FIG. 2. Further, the average can be calculated not only from data which is currently read but also from image signal which had been read previously. Next at step S43, exposure correction is performed on the basis of the average. In this case, the exposure correction is performed so that the average is to be, for example, 50±5 with respect to the saturation level 100. When the level as a result of the exposure correction based on the average becomes within 50±5, namely background portion and character portion are separated to a higher level and a lower level with respect to the average level, exposure correction is performed on the basis of the background portions not considering the character portions. Note that the above explanation is based on the assumption in which character has lower signal level than the signal level of the background. Therefore, if white characters are written in colored background, which is a case opposite to the above example, only character portion can be extracted, and background portion is ignored.

First at step S45, image data, D, is read, and the data D is compared with the average, Dav, at step S46. If the comparison result is D>Dav+5, then DH is replaced by DH+D and N is incremented by 1. Then at step S47, whether or not D is the last data is checked. The reason why D is compared with Dav+5 is to extract background part strictly (in a case where black characters are written). The value to be added to Dav is any proper number which is larger than 0. Further, if D is less or equal to Dav+5, then whether or not D is the last data is checked. If it is not the last data, the process goes back to step S44 where new data is read, whereas if it is, an operation DHav=DH/N is performed. This DHav is considered as the detected data, and the detection process is completed at step S49. On the basis of the detected data, exposure correction is performed so that the detection value is, for example, 75 with respect to the saturation level 100.

According to the fifth embodiment, by extracting only parts of the signal having higher levels than the average level of entire part of the signal in the detection area and by performing exposure correction so that the average level of the extracted parts of the signal is close to the target value, exposure conditions can be controlled based only on the signal level of the background portion excluding the character portions in a document. Thus, exposure correction suitable for the document mode can be performed.

In the fifth embodiment, the average level of all parts of the signal in the detection area is calculated and used as a threshold level, however, the threshold level can be a fixed value. For example, if the saturation level is 100, exposure correction may be performed on the basis of portions of the signal whose signal levels are greater or equal to 50. In this case, it is necessary to calculate the average value, thus the processing time can be shortened.

In a case where the light exposure is set extremely high or extremely low, by repeating exposure control, it is possible to determine final exposure conditions after the light exposure approached to proper level.

Further, in order to avoid difficulty caused by a bright portion in a document, some brightest parts of the signal out of parts of the signal whose levels are greater or equal to a threshold can be ignored in the fifth embodiment, as described in the fourth embodiment. In order to do so, a second threshold level is set to 90, for example, with respect to the saturation level, 100, and the average may be calculated without using signal levels greater or equal to 90. Then, the obtained average is used as a detected signal for exposure control.

Further, if an image sensing apparatus has high processing ability, a luminance area to be corrected may be determined by using a histogram of luminance level of the image. In this case, the peak position or positions of the histogram are found first, and, if there are two peak positions, a signal of the position having the higher level is used, and, if there are more than three peak positions, then a signal of the position having the second highest level is used to perform exposure correction in order to avoid the problem caused by a bright portion such as a light source (e.g., strobe light) in the document.

<Sixth Embodiment>

In a case where there is not so much difference between luminance levels of character portions and of background portions in a document, if the exposure correction as described above is performed, an image signal is like a signal shown in FIG. 11(b). When this image signal is reproduced, borders between the character portions and the background portions will not be clear, and the obtained image may be very hard to identify. In the sixth embodiment, aforesaid problem is to be solved.

Figure 9:
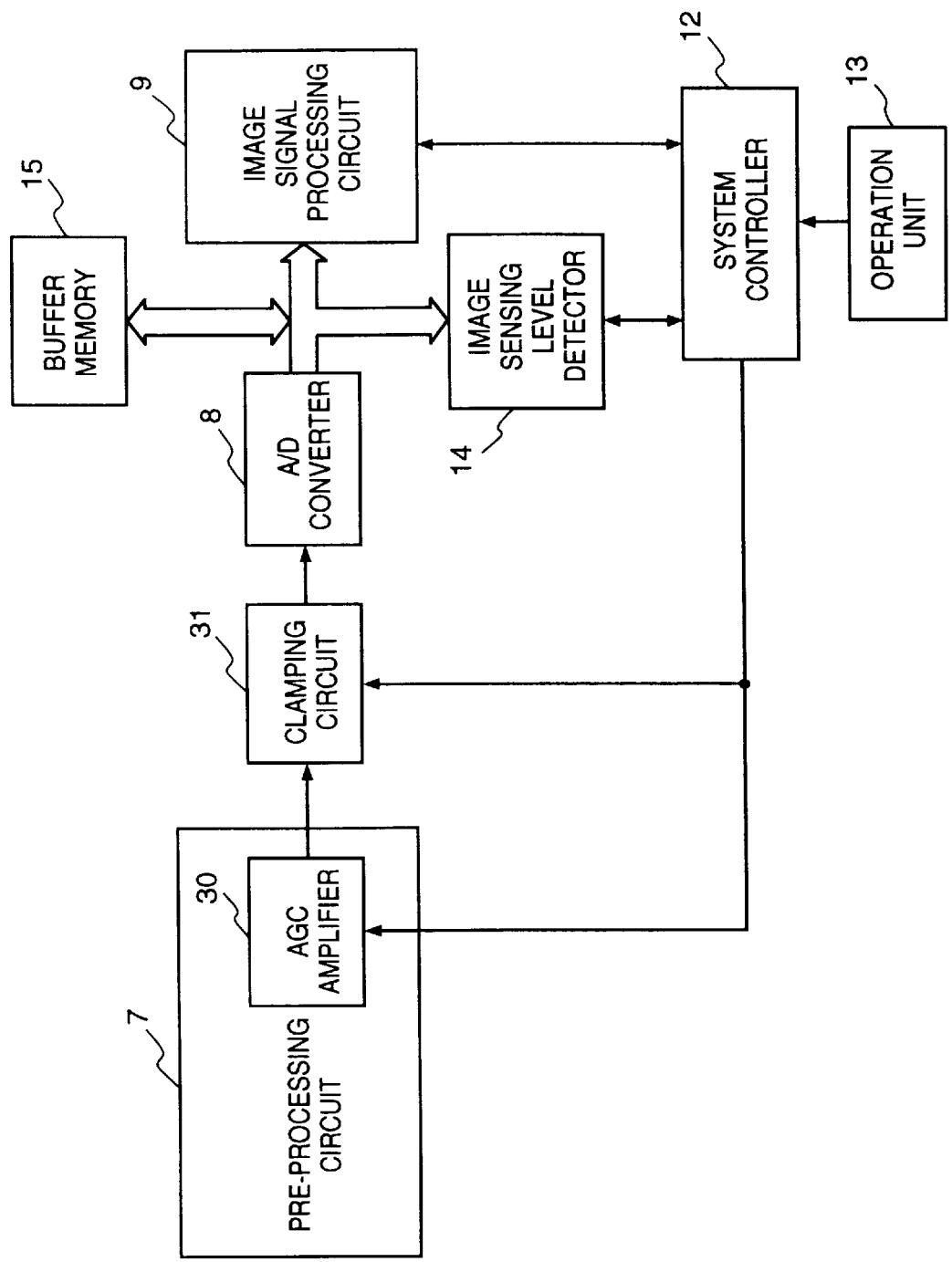
FIG. 9 is a block diagram illustrating a configuration of an image sensing apparatus according to a sixth embodiment.

FIG. 9 is a block diagram illustrating a configuration of a part of an image sensing apparatus of the sixth embodiment of the present invention. In FIG. 9, reference numeral 30 denotes an AGC amplifier, provided in the pre-processing circuit 7, for changing gain under control of the system controller 12. Further, reference numeral 31 denotes a clamping circuit for deciding a DC level of a signal to be inputted into the A/D converter 8, and a pulse clamping and a dark clamping which will be explained later in the clamping circuit 31 are switched under control of the system controller 12.

Figure 10:
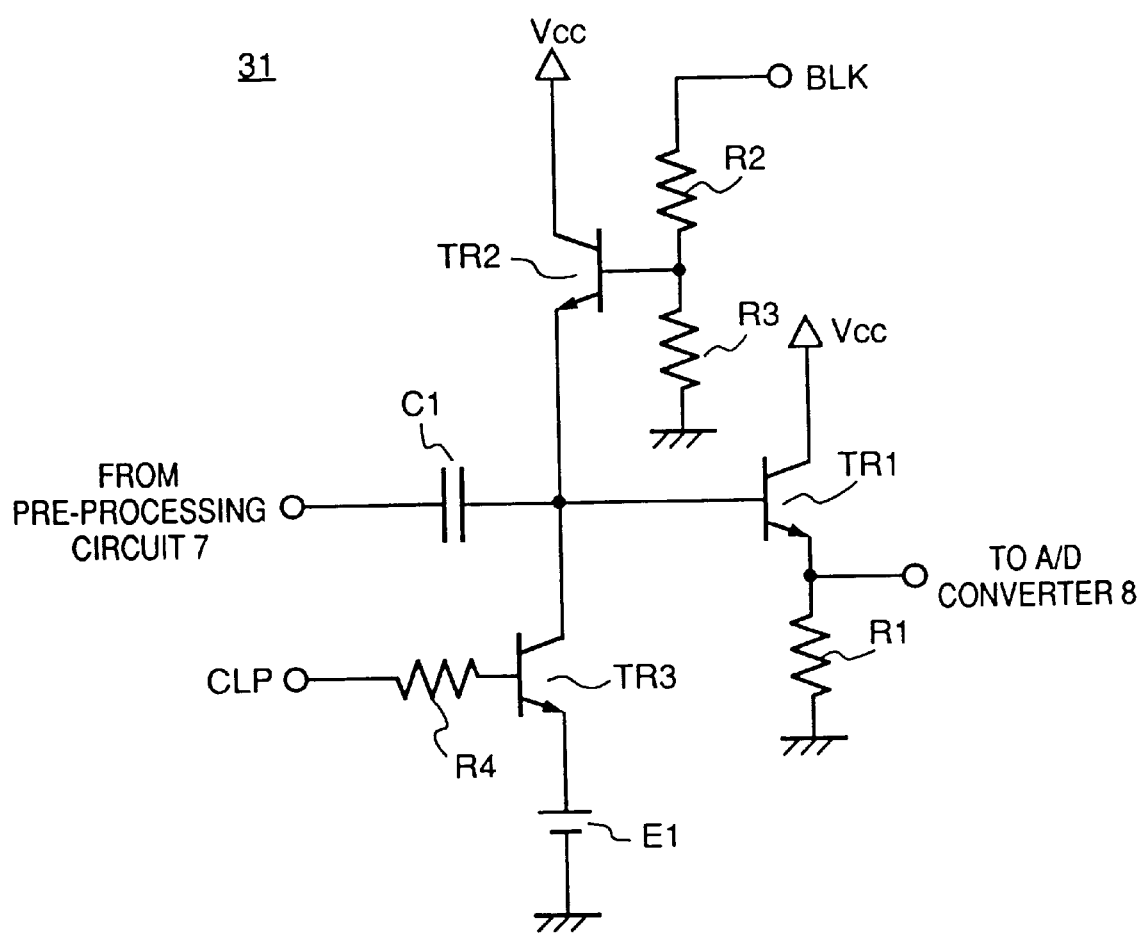
FIG. 10 is a block diagram illustrating a clamping circuit shown in FIG. 9.

FIG. 10 is a circuit diagram showing a construction of the clamping circuit 31 shown in FIG. 9. In FIG. 9, R1 to R4 are resistors, TR1 to TR3 are NPN transistors, C1 is a condenser, and E1 is a standard voltage source. Further, FIG. 11 is a timing chart of pulses and signals to be inputted into the circuit shown in FIG. 10.

The operation of the sixth embodiment will be described below.

As shown in FIG. 9, an image signal from the pre-processing circuit 7 enters the clamping circuit 31.(refer to FIG. 11(a)). In the picture mode, a BLK (blanking) pulse to be inputted into the clamping circuit 31 remained low, and the CLP (clamp) pulse is high while periods in which the image signal is not inputted (periods in which a horizontal synchronization signal is "LOW"), as shown in FIGS. 11(c) and 11(d), respectively. Therefore, in the clamping circuit 31 in FIG. 10, TR2 is always "OFF". Meanwhile, TR3, R4, C1, and E1 serve as so called a pulse clamp. An output signal to the A/D converter 8 in that case is shown in FIG. 11(e). More specifically, when the CLP pulse is "HIGH", TR3 becomes conductive and a DC level of the image signal is used as a standard level of the A/D converter 8.

On the other hand, in the document mode, an operation is as follow.

First, the clamping circuit 31 operates as a pulse clamp similar to that in picture mode, and exposure correction is performed in the same method as described in the aforesaid embodiments. After the exposure correction has been completed, the CLP pulse maintains low, and the BLK pulse becomes high while periods in which the image signal is inputted (periods in which a horizontal synchronization signal is "HIGH") as shown in FIGS. 11(h) and 11(g), respectively. Therefore, TR3 in the clamping circuit 31 is always "OFF". Whereas, the lowest signal level among levels of signals inputted from the pre-processing circuit 7 while periods in which the image signal is inputted is fixed to a base voltage of TR1 as a standard voltage of E2 by the dark clamping circuit composed of TR2, R2, R3, and C1. Here, let a voltage of the BLK pulse in high level be Vcc, E2 is obtained in accordance with following equation:

$$E2=(Vcc \times R3)/(R2+R3)-Vbe2 \qquad (1)$$

where Vbe2 is a voltage between the base and emitter of TR2. By adjusting this standard voltage E2 to be the same voltage of E1, DC levels of the clamping circuit 31 in the picture mode and in the document mode can be made the same.

As described above, the lowest level of the clamped image signal is made a standard level, as shown in FIGS. 11(i) and 11(j), by the dark clamping circuit. An image sensing level is determined again in the image sensing level detector 14 on the basis of the clamp-corrected image signal. Then, the correction by the detected amount (higher the black level is, higher the gain is to set) are performed by changing gains by the AGC amplifier 30, not by controlling iris diaphragm and shutter speed. Accordingly, the final image signal to enter the A/D converter 8 becomes like a signal shown in FIG. 11(k).

According to the sixth embodiment, when levels of character potions are relatively high in sensing a document, for instance, namely when a signal is like the one shown in FIG. 11(b), it is possible to prevent a problem in that levels of the black portions of the image signal rise too much and that luminance levels of the black portions become too high in reproducing an image. Thereby, it is possible to obtain a reproduced image on which characters and background are clearly separated.

It should be noted that the method explained in the sixth embodiment utilizing an analog configuration, however, the same method can be applied to a digital signal after A/D conversion.

FIG. 12 is a block diagram showing the first to sixth embodiments generally and conceptually.

In FIG. 12, an image sensing element 201 corresponds to the image sensing element 4 shown in FIG. 1, and exposing means 202 is for exposing the image sensing element 201 and corresponds to the iris/shutter 1 shown in FIG. 1. Gain control means 203 controls gain of an image signal outputted form the image sensing element 201 and corresponds to the AGC amplifier 30 shown in FIG. 9. Clamping means clamps the image signal and corresponds to the clamping circuit 31 shown in FIG. 9.

Further, reference numeral 205 denotes first mode means for generating a picture signal when the picture mode is selected and consists of the color separation circuit 101, the color matrix circuit 102, the white balance correction circuit 103, the color difference signal generator 104, the low frequency luminance signal correction signal generator 105, the color modulated amount trap circuit 106, the horizontal aperture circuit 107, the vertical aperture circuit 108, the adder 109, the subtractor 110, all of which are shown in FIG. 14, and the system controller 12 and the like.

Reference numeral 206 denotes second mode means for generating a high resolution image signal when the document mode is selected, and consists of the color component correction circuit 112, the switches 113 and 114, the integrators 115 and 116, all of which are shown in FIG. 14, and the system controller 12 and the like. Reference numeral 207 denotes a selecting means for selecting either a first mode or a second mode, and consists of the selector 111, shown in FIG. 14, and the system controller 12.

Detecting means 208 detects an image signal level and corresponds to the image sensing level detector 14 in FIG. 1. Control means 209 includes correction means 209a, first average determination means 209b, second average determination means 209c, and so on, and corresponds to the system controller 12 shown in FIG. 1.

An operation of an apparatus having above configuration is described below.

When the selecting means 207 selects the second mode, an image signal from the image sensing element 201 exposed by the exposing means 202 is inputted into the second mode means 206 via the gain control means 203, the clamping means 204 and the selecting means 207. The high resolution image signal is generated in the second mode means 206.

Whereas, levels of the image signal are detected by the detecting means 208, and the control means 209 perform either or both light exposure control by the exposing means 202 and gain control by the gain control means 203 in accordance with signal levels in a predetermined range of level selected from the detected signal levels. At this time, the correction means 209a sets a target value for the image signal level in accordance with either the first or the second mode which is selected, and the detected level is controlled so as to approach the target value.

Further, the first average determination means 209b determines an average of the detected levels when necessary, and the second average determination means 209c determines an average of the detected levels which are higher than the average determined by the first average determination means 209b. Next, the correction means 209a controls the exposing means 202 so that the average determined by the second average determination means 209c approaches to the target value.

Further, the clamping means 204 clamps the image signal level to its lowest level in the second mode when necessary.

The present invention can be applied to a system constituted by a plurality of devices or to an apparatus comprising a single device.

Furthermore, the invention is applicable also to a case where the invention is embodied by supplying a program to a system or apparatus. In this case, a storage medium, storing a program according to the invention constitutes the invention. The system or apparatus installed with the program read from the medium realizes the functions according to the invention.

The present invention is not limited to the above embodiments and various changes and modifications can be made within the spirit and scope of the present invention. Therefore to appraise the public of the scope of the present invention, the following claims are made.

What is claimed is:

1. An image sensing apparatus having image sensing elements for converting an optical image of an object into electrical image signals and constructed so as to generate low resolution image signals on the basis of the electrical image signals in a first mode or to generate high resolution image signals in a second mode, selectively, comprising:

detecting means for detecting levels of the electrical image signals; and correction means for correcting either exposure of said image sensing elements or levels of the electrical image signals or both on the basis of an average level of the electrical image signals whose levels are detected by said detecting means so that the average level of the electrical image signals approach a predetermined average value in the first mode, and for correcting either exposure of said image sensing elements or levels of the electrical image signals or both on the basis of a peak level of the electrical image signals so that the peak level of the electrical image signals approach a predetermined peak value in the second mode.

2. An image sensing method comprising the steps of:

preparing a first mode for sensing a picture image and a second mode for sensing a document image;

controlling either exposure of image sensing elements or gain of electrical image signals or both on the basis of an average level of electrical image signals in the first mode so that the average level of the electrical image signals approach a first target value;

controlling either the exposure of said image sensing elements or the gain of the electrical image signals or both on the basis of a peak level of electrical image signals in the second mode so that the peak level of the electrical image signals approach to a second target value.

3. An image pickup apparatus comprising:

(a) image pickup means;

(b) switch means for switching between a first mode for picking up a picture image and a second mode for picking up a document image; and (c) control means for changing an exposure control condition depending on said first mode and said second mode.

4. An image pickup apparatus comprising:

(a) image sensing device for forming an image signal;

(b) detecting circuit for detecting a brightness of an object to be picked up;

(c) mode setting circuit for setting one of a photography mode and a document mode; and (d) control circuit for changing a detection characteristic of said detecting circuit in accordance with a mode set by said mode setting circuit.

5. An image pickup apparatus according to claim 4, wherein said control circuit changes said detection characteristics between an average detection mode and a peak detection mode.

6. An image pickup apparatus comprising:
   (a) image sensing device for forming an image signal;
   (b) exposure adjusting circuit for adjusting an exposure condition of said image sensing device to a predetermined target condition;
   (c) mode setting circuit for setting one of a photography mode and a document mode; and
   (d) control circuit for changing said target condition in accordance with a mode set by said mode setting circuit.

7. An image pickup apparatus according to claim 6, wherein said control circuit sets said target condition for said photography mode lower than said document mode.

* * * * *